United States Patent
Farris et al.

[19]

[11] Patent Number: 6,155,541

[45] Date of Patent: *Dec. 5, 2000

[54] SUSPENSION ASSEMBLY FOR A VEHICLE

[75] Inventors: Mark S. Farris; Michael A. Harrison, both of Ketchum, Id.; John M. Loftus, Costa Mesa, Calif.; Aaron K. Taylor, Hailey, Id.; Christoph E. Mack, Georgetown; Ross P. Collins, Norwalk, both of Conn.

[73] Assignee: Cannondale Corporation, Bethel, Conn.

[ * ] Notice: This patent is subject to a terminal disclaimer.

[21] Appl. No.: 09/456,069

[22] Filed: Dec. 6, 1999

Related U.S. Application Data

[63] Continuation of application No. 08/936,920, Sep. 23, 1997, Pat. No. 6,007,056, which is a continuation of application No. 08/584,922, Jan. 11, 1996, Pat. No. 5,702,092, which is a division of application No. 08/037,949, Mar. 26, 1993, Pat. No. 5,494,302, which is a continuation-in-part of application No. 07/713,673, Jun. 11, 1991, Pat. No. 5,320,374.

[51] Int. Cl.⁷ ....................................................... F16F 9/14
[52] U.S. Cl. ......................................................... 267/64.15
[58] Field of Search ..................................... 188/299, 316, 188/319, 322.12; 280/276, 277; 267/64.15

[56] References Cited

U.S. PATENT DOCUMENTS

| | | |
|---|---|---|
| Re. 31,212 | 4/1983 | Smith . |
| D. 368,880 | 4/1996 | Harrington . |
| 575,152 | 1/1897 | Fogg . |
| 601,978 | 4/1898 | Nevill . |
| 636,726 | 11/1899 | Hindmarsh . |
| 689,970 | 12/1901 | Horack . |
| 723,075 | 3/1903 | Thoms . |
| 846,079 | 5/1907 | Yost . |
| 1,205,433 | 11/1916 | Christman . |
| 1,273,011 | 7/1918 | Snyder . |
| 2,148,839 | 2/1939 | Rossman et al. ........................... 188/88 |
| 2,240,644 | 5/1941 | Focht ......................................... 188/88 |
| 2,477,748 | 8/1949 | Hutchins ................................. 280/277 |
| 2,487,472 | 11/1949 | Patriquin ................................... 188/88 |
| 2,493,342 | 1/1950 | Eldred et al. ........................... 244/104 |
| 2,561,156 | 7/1951 | Thorkildsen ............................ 280/276 |
| 2,567,144 | 9/1951 | Butterfield . |
| 2,683,044 | 7/1954 | Seddon .................................... 280/276 |

(List continued on next page.)

FOREIGN PATENT DOCUMENTS

| | | |
|---|---|---|
| 0 173 020 | 6/1985 | European Pat. Off. . |
| 0 443 690 A1 | 2/1991 | European Pat. Off. . |
| 420610 | 3/1991 | European Pat. Off. . |
| 0 431 596 A1 | 6/1991 | European Pat. Off. . |

(List continued on next page.)

OTHER PUBLICATIONS

John Remling, *Steering and Supension*, (Oct. 20, 1983), pp. 336–338.

Mountain Bike Action (Feb. 1991), cover and pp. 5, 32–34, 36–43, 47–70, 97.

1992 Cannondale Catalogue.

1993 Cannondale Catalogue.

*Bicycling* (Apr. 1991), cover and pp. 4, 84–98.

*Primary Examiner*—Christopher P. Schwartz
*Assistant Examiner*—C. T. Bartz
*Attorney, Agent, or Firm*—Pennie & Edmonds LLP

[57] ABSTRACT

A suspension assembly, including inner and outer tubes that are adapted to the telescope with respect to each other. A self-contained shock-damping cartridge is disposed in the tubes and is removable as a unit. The cartridge has first and second chambers, which contain hydraulic fluid. A shaft movably extends substantially completely through both chambers, and a piston is associated with the shaft and the chambers such that movement of the shaft within the chambers forces hydraulic fluid from one of the chambers to the other, thus damping telescoping movement between the tubes. The cartridge is sealed to substantially prevent the hydraulic fluid from entering and exiting therefrom during telescoping movement.

22 Claims, 21 Drawing Sheets

U.S. PATENT DOCUMENTS

| | | |
|---|---|---|
| 2,708,112 | 5/1955 | Seddon et al. .............................. 267/63 |
| 2,771,968 | 11/1956 | Mercier ..................................... 188/96 |
| 2,935,334 | 5/1960 | Felts . |
| 2,992,013 | 7/1961 | Zeigler et al. . |
| 3,083,038 | 3/1963 | Moulton ................................ 280/276 |
| 3,180,453 | 4/1965 | Murata . |
| 3,208,767 | 9/1965 | Moulton ................................ 280/276 |
| 3,301,575 | 1/1967 | Ryan et al. .............................. 280/275 |
| 3,327,814 | 6/1967 | Nickell .................................... 188/129 |
| 3,369,802 | 2/1968 | Wallace et al. ............................. 267/1 |
| 3,376,031 | 4/1968 | Lee ............................................. 267/1 |
| 3,420,341 | 1/1969 | Keehn, II ................................. 188/88 |
| 3,459,441 | 8/1969 | Hornsby ................................. 280/276 |
| 3,548,977 | 12/1970 | Morgan ................................... 188/88 |
| 3,559,776 | 2/1971 | Schultze ................................. 188/299 |
| 3,763,970 | 10/1973 | Anderson ............................... 188/282 |
| 3,797,276 | 3/1974 | Orain ...................................... 64/23.7 |
| 3,827,538 | 8/1974 | Morgan ................................. 188/319 |
| 3,907,080 | 9/1975 | Chadwick ......................... 188/322.12 |
| 3,937,307 | 2/1976 | de Kock ................................. 188/319 |
| 3,964,765 | 6/1976 | Zenser ................................... 280/276 |
| 3,971,571 | 7/1976 | Yoshioka . |
| 3,984,119 | 10/1976 | Okazima ................................ 280/276 |
| 4,043,435 | 8/1977 | DeKock et al. ........................ 188/319 |
| 4,057,264 | 11/1977 | Suzuki et al. ........................... 280/276 |
| 4,162,091 | 7/1979 | Sano . |
| 4,191,280 | 3/1980 | Copperwheat ......................... 188/300 |
| 4,254,639 | 3/1981 | Teramachi .............................. 64/23.7 |
| 4,295,658 | 10/1981 | Kashima . |
| 4,318,535 | 3/1982 | Imai . |
| 4,372,575 | 2/1983 | Hyma . |
| 4,415,057 | 11/1983 | Yamaguchi . |
| 4,509,686 | 4/1985 | Kimberlin ................................. 74/492 |
| 4,531,759 | 7/1985 | Rezanda et al. . |
| 4,537,374 | 8/1985 | Barnoin et al. ...................... 244/102 R |
| 4,591,030 | 5/1986 | Antkowiak ............................. 188/268 |
| 4,616,163 | 10/1986 | Kanai et al. . |
| 4,620,720 | 11/1986 | Sakata et al. . |
| 4,705,491 | 11/1987 | Andersson ............................... 464/167 |
| 4,735,401 | 4/1988 | Buma et al. . |
| 4,805,929 | 2/1989 | Shibata et al. . |
| 4,815,763 | 3/1989 | Hartmann ............................... 280/276 |
| 4,865,348 | 9/1989 | Hano et al. . |
| 4,881,750 | 11/1989 | Hartmann . |
| 4,898,566 | 2/1990 | Hakansson ............................... 464/167 |
| 4,971,344 | 11/1990 | Turner ................................... 280/276 |
| 5,022,673 | 6/1991 | Sekino et al. . |
| 5,031,732 | 7/1991 | Batek et al. ........................ 188/322.12 |
| 5,039,072 | 8/1991 | Bartholomew ..................... 188/322.12 |
| 5,044,648 | 9/1991 | Knapp ..................................... 280/283 |
| 5,074,678 | 12/1991 | Eberle ........................................ 384/49 |
| 5,098,120 | 3/1992 | Hayashi et al. . |
| 5,104,101 | 4/1992 | Anderson et al. ....................... 267/219 |
| 5,106,257 | 4/1992 | Braud et al. . |
| 5,157,987 | 10/1992 | Satoh et al. .............................. 74/581 |
| 5,163,697 | 11/1992 | Kastan . |
| 5,195,766 | 3/1993 | Dohrmann et al. ..................... 280/276 |
| 5,271,485 | 12/1993 | Yowell et al. ........................... 188/312 |
| 5,275,264 | 1/1994 | Isella ...................................... 188/299 |
| 5,284,352 | 2/1994 | Chen ..................................... 280/276 |
| 5,308,099 | 5/1994 | Browning ............................... 280/276 |
| 5,324,066 | 6/1994 | Masamura et al. . |
| 5,346,236 | 9/1994 | Ohma . |
| 5,398,411 | 3/1995 | Kusaka et al. . |
| 5,444,979 | 8/1995 | Funami et al. . |
| 5,449,188 | 9/1995 | Ohma . |
| 5,470,090 | 11/1995 | Stewart et al. . |
| 5,472,221 | 12/1995 | Kameda et al. . |
| 5,480,011 | 1/1996 | Nagai et al. . |
| 5,509,675 | 4/1996 | Barnett ................................... 280/276 |
| 5,509,677 | 4/1996 | Bradbury . |
| 5,529,154 | 6/1996 | Tanaka . |
| 5,556,082 | 9/1996 | Takasaki . |
| 5,597,054 | 1/1997 | Nagai et al. . |
| 5,597,169 | 1/1997 | Bradbury . |
| 5,626,355 | 5/1997 | Voss et al. . |
| 5,678,847 | 10/1997 | Izawa et al. . |

FOREIGN PATENT DOCUMENTS

| | | |
|---|---|---|
| 0 508 134 A2 | 10/1992 | European Pat. Off. . |
| 0 541 891 A1 | 5/1993 | European Pat. Off. . |
| 0 468 138 B1 | 12/1993 | European Pat. Off. . |
| 0 424 942 B1 | 3/1994 | European Pat. Off. . |
| 0 376 802 B1 | 5/1994 | European Pat. Off. . |
| 0 377 220 B1 | 11/1994 | European Pat. Off. . |
| 0 551 266 B1 | 7/1995 | European Pat. Off. . |
| 0 508 134 B1 | 8/1995 | European Pat. Off. . |
| 0 467 967 B1 | 11/1995 | European Pat. Off. . |
| 0 488 375 B1 | 4/1996 | European Pat. Off. . |
| 0 553 901 B1 | 5/1996 | European Pat. Off. . |
| 0 538 949 B1 | 8/1996 | European Pat. Off. . |
| 0 726 198 A2 | 8/1996 | European Pat. Off. . |
| 0 734 944 A2 | 10/1996 | European Pat. Off. . |
| 0 739 811 A2 | 10/1996 | European Pat. Off. . |
| 362619 | 7/1906 | France . |
| 1081066 | 7/1953 | France . |
| 924 073 | 2/1955 | Germany . |
| 415195 | 9/1946 | Italy . |
| 416260 | 11/1946 | Italy . |
| 571871 | 1/1958 | Italy . |
| 49-54243 | 8/1972 | Japan . |
| 54-13162 | 6/1977 | Japan . |
| 54-42570 | 4/1979 | Japan . |
| 55-27192 | 2/1980 | Japan . |
| 56-094046 | 7/1981 | Japan . |
| 56-138535 | 10/1981 | Japan . |
| 56-14638 | 12/1981 | Japan . |
| 57-069135 | 4/1982 | Japan . |
| 57094142 | 6/1982 | Japan . |
| 57-144328 | 9/1982 | Japan . |
| 57-146931 | 9/1982 | Japan . |
| 58-118408 | 8/1983 | Japan . |
| 58-180846 | 10/1983 | Japan . |
| 60-034540 | 2/1985 | Japan . |
| 60-038220 | 2/1985 | Japan . |
| 60-0543418 | 3/1985 | Japan . |
| 62-162184 | 10/1987 | Japan . |
| 62-251540 | 11/1987 | Japan . |
| 63-130941 | 6/1988 | Japan . |
| 63-32431 | 8/1988 | Japan . |
| 63-196793 | 12/1988 | Japan . |
| 01172092 | 7/1989 | Japan . |
| 01172093 | 7/1989 | Japan . |
| 1 195195 | 8/1989 | Japan . |
| 01289788 | 11/1989 | Japan . |
| 03292277 | 4/1990 | Japan . |
| 02125118 | 5/1990 | Japan . |
| 02182514 | 7/1990 | Japan . |
| 02182592 | 7/1990 | Japan . |
| 04260888 | 2/1991 | Japan . |
| 03050083 | 3/1991 | Japan . |
| 03070690 | 3/1991 | Japan . |
| 03092634 | 4/1991 | Japan . |
| 04316733 | 4/1991 | Japan . |
| 3-107635 | 5/1991 | Japan . |
| 03189283 | 8/1991 | Japan . |
| 03189284 | 8/1991 | Japan . |
| 03189285 | 8/1991 | Japan . |
| 03200496 | 9/1991 | Japan . |
| 03220081 | 9/1991 | Japan . |
| 03266784 | 11/1991 | Japan . |
| 04038288 | 2/1992 | Japan . |

| | | | | | | |
|---|---|---|---|---|---|---|
| 04133892 | 5/1992 | Japan . | | 06263078 | 9/1994 | Japan . |
| 04173490 | 6/1992 | Japan . | | 06270875 | 9/1994 | Japan . |
| 04189693 | 7/1992 | Japan . | | 06305472 | 11/1994 | Japan . |
| 04290626 | 10/1992 | Japan . | | 602 077 | 8/1934 | Netherlands . |
| 04292286 | 10/1992 | Japan . | | 802 551 | 7/1949 | Netherlands . |
| 5-14693 | 2/1993 | Japan . | | 803 399 | 7/1949 | Netherlands . |
| 05126194 | 5/1993 | Japan . | | 213191 | 3/1924 | United Kingdom . |
| 05126195 | 5/1993 | Japan . | | 264003 | 1/1927 | United Kingdom . |
| 05178258 | 7/1993 | Japan . | | 295316 | 11/1928 | United Kingdom . |
| 05187472 | 7/1993 | Japan . | | 469697 | 7/1937 | United Kingdom . |
| 05319347 | 12/1993 | Japan . | | 529305 | 11/1940 | United Kingdom . |
| 06094063 | 4/1994 | Japan . | | 565630 | 11/1944 | United Kingdom . |
| 06107263 | 4/1994 | Japan . | | 585 122 | 1/1947 | United Kingdom . |
| 06159423 | 6/1994 | Japan . | | 585681 | 2/1947 | United Kingdom . |
| 06183386 | 7/1994 | Japan . | | 91-13796 | 9/1991 | WIPO . |
| 06191461 | 7/1994 | Japan . | | 97/43166 | 11/1997 | WIPO . |

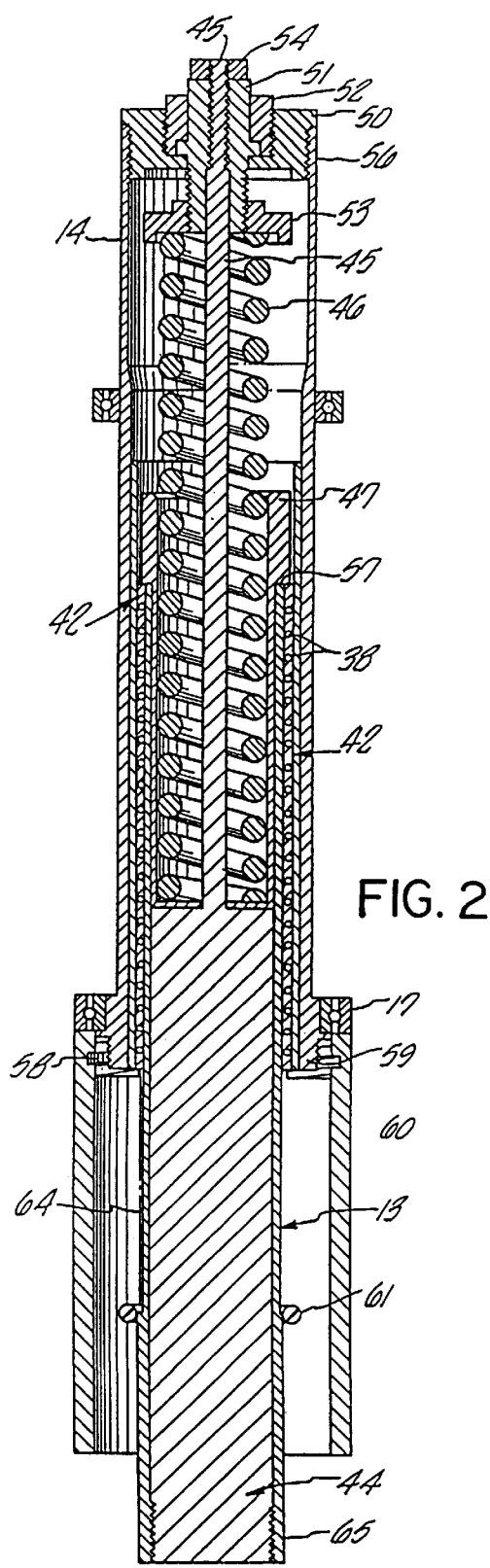
FIG. 2
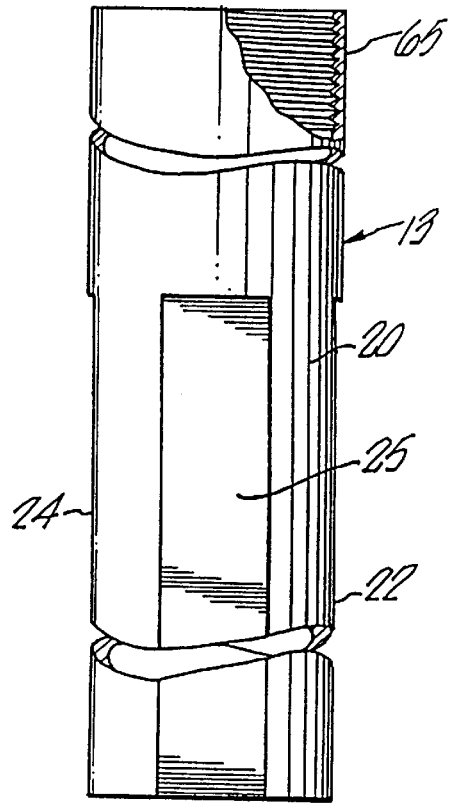
FIG. 3B
FIG. 3A
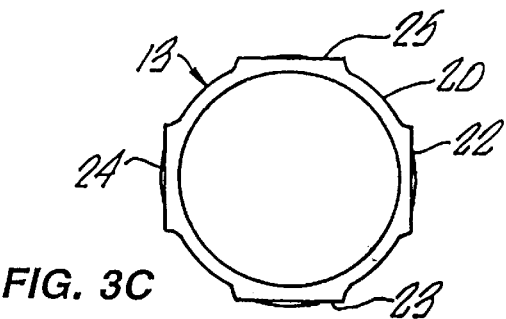
FIG. 3C

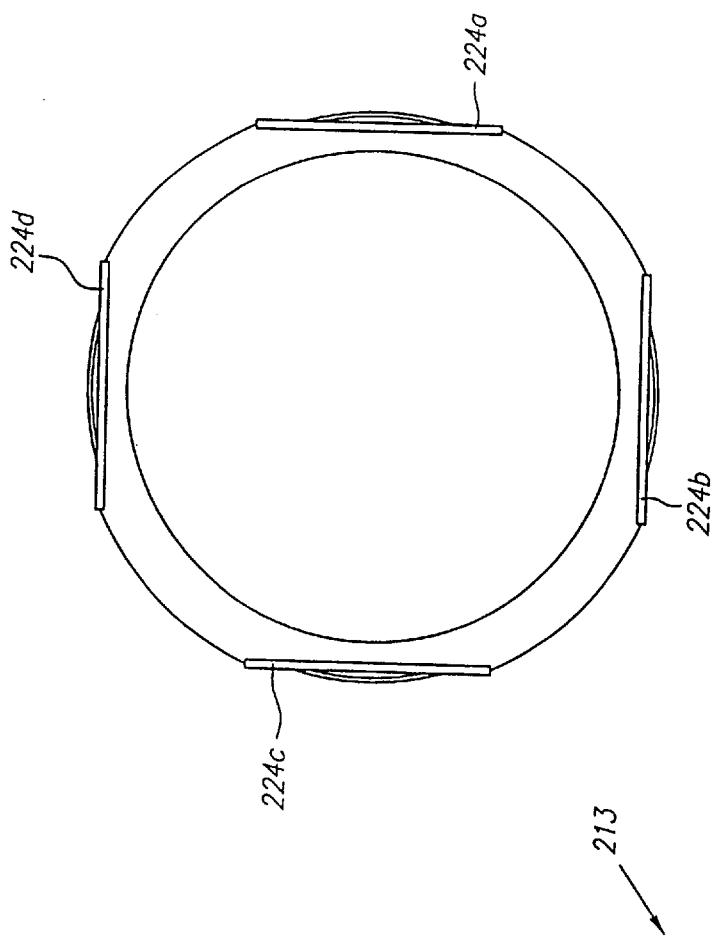
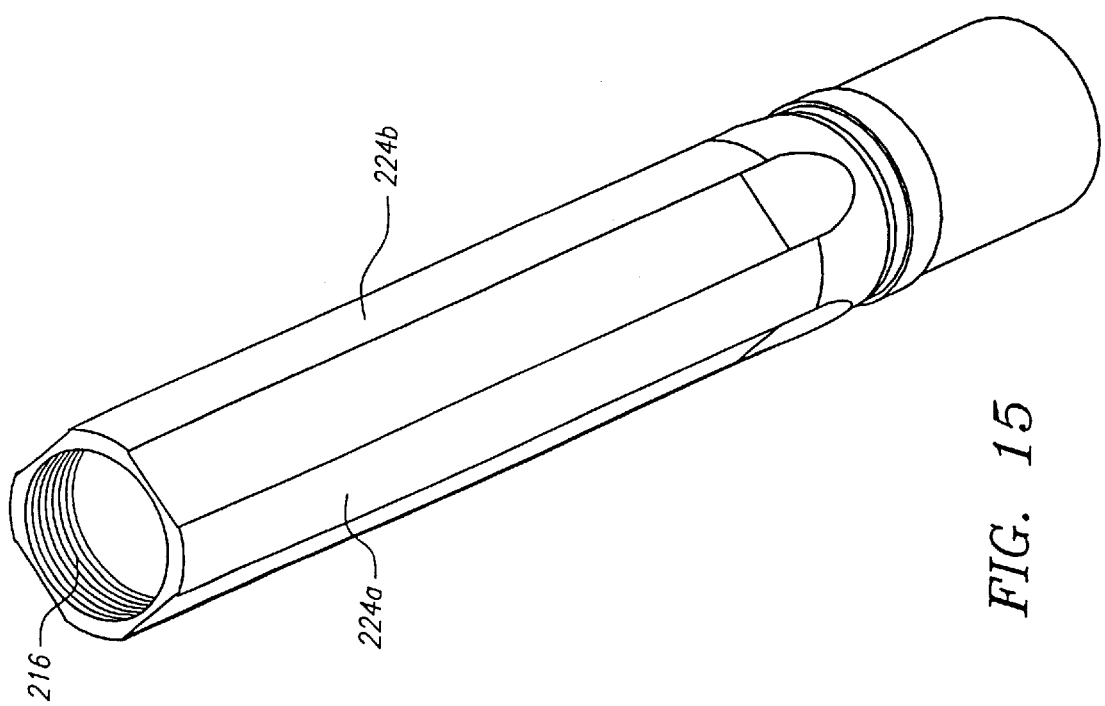

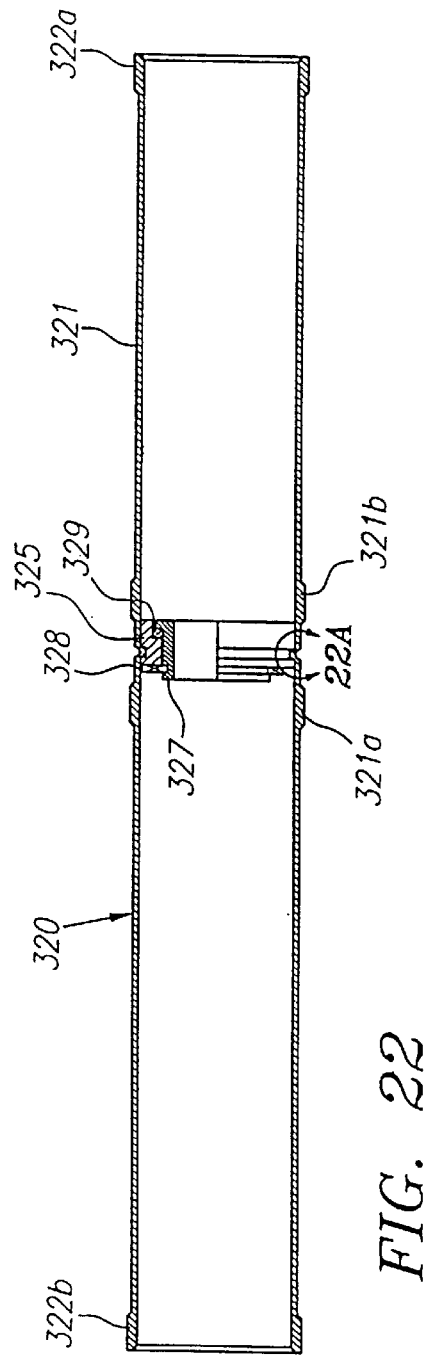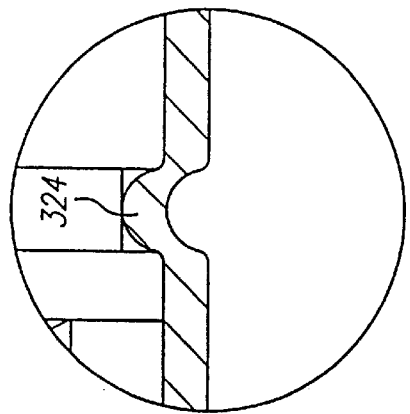
FIG. 22
FIG. 22A

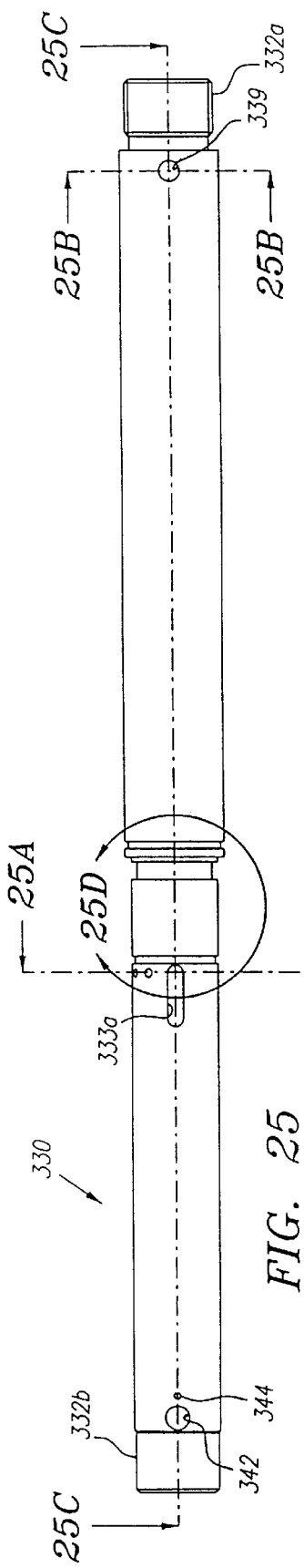
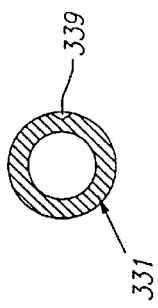
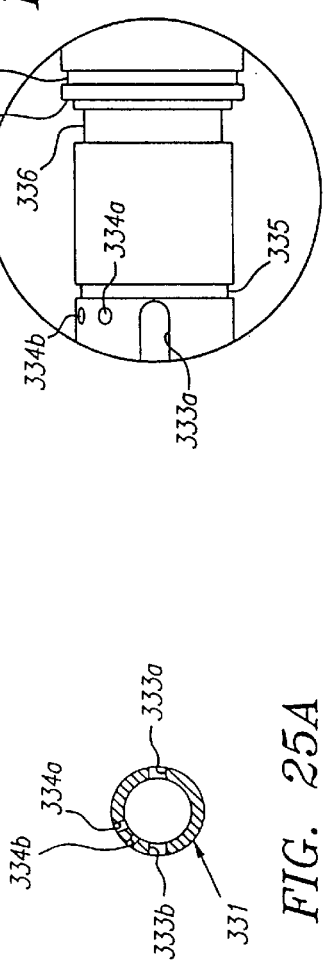
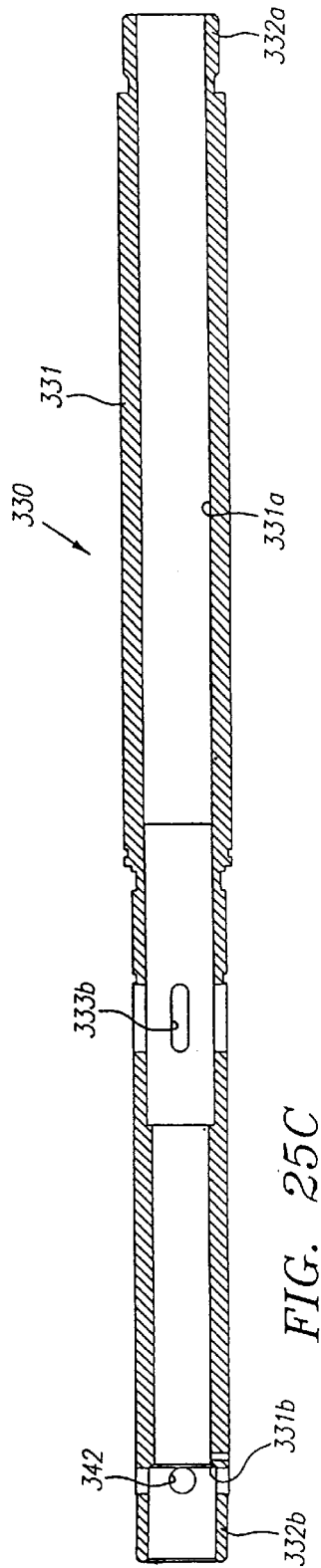

5,155,541

SUSPENSION ASSEMBLY FOR A VEHICLE

RELATED APPLICATION DATA

This application is a continuation of application Ser. No. 08/936,920, filed Sep. 23, 1997, U.S. Pat. No. 6,007,056 which is a continuation of application Ser. No. 08/584,922, filed Jan. 11, 1996, U.S. Pat. No. 5,702,092, which is a division of application Ser. No. 08/037,949, filed Mar. 26, 1993, U.S. Pat. No. 5,494,302, which is a continuation-in-part of U.S. patent application Ser. No. 07/713,673 filed Jun. 11, 1991, U.S. Pat. No. 5,320,374.

BACKGROUND OF THE INVENTION

The field of the present invention relates to suspension systems and more particularly to a suspension assembly for a vehicle such as a bicycle.

BACKGROUND OF THE INVENTION

Various forms of suspension systems have been proposed and developed for bicycles. The most common form of fork suspension system for bicycles is similar to that used on motorcycles and comprises a pair of telescoping assemblies between which the front wheel is mounted. Each telescoping assembly comprises an outer tube, and an inner tube which is free to move in and out of the outer tube and is cushioned in some manner, as by springs and/or a hydraulic system. Generally, the outer tubes are connected at the lower ends to the axle of the front wheel of the bicycle, and the upper ends of the inner tubes are connected together in a fashion similar to the usual upper end of a bicycle fork and extend into the head tube of the bicycle frame. A number of examples of suspension forks for bicycles are shown in the February 1991 issue of Mountain Bike Action, particularly beginning at page 32 thereof. Other bicycle suspension arrangements comprise a single telescoping assembly coupled between the front wheel fork and the head tube of the bicycle frame In either form of suspension, bushings usually are provided between the telescoping tubes to reduce friction.

Riders have found that suspension front forks can benefit handling and improve control, and a front suspension helps the front wheel follow the ground. A front suspension system is desirable for absorbing bumps, and can enable the bicycle to handle better at higher speeds and be more controllable under rough conditions. Although the front suspension systems of many motorcycles provide these features for motorcycles, they are bulky and heavy, and the designs thereof are not readily adaptable to bicycle use.

Several prior art examples of front suspension systems for bicycles are shown in Horack U. S. Pat. No. 689,970 and Moulton U.S. Pat. No. 3,208,767. The Horack system provides a spring suspension, and includes a ball bearing system for allowing both an axial telescoping action and a rotary steering action. The Moulton patent discloses a spline-type spring suspension. Other suspension systems of interest are shown in Thoms U.S. Pat. No. 723,075, Hutchins U.S. Pat. No. 2,477,748, Ryan U.S. Pat. No. 3,301,575, Hornsby U.S. Pat. No. 3,459,441, Zenser U.S. Pat. No. 3,964,765, Hartman U.S. Pat. No. 4,815,763, British Specification No. 295316 of November 1928, and Italian Patent No. 416,260 of November 1946.

As is known to those skilled in the art, any form of system using anti-friction bushings and the like have undesirable static friction called "stiction." Because of this, suspension systems using such bushings tend to stick and then suddenly release or move, and the point at which they release gets higher with higher loads (e. g., a higher radial load caused by a braking load). The dual telescoping assembly presently used on some bicycles is essentially an adaptation of motorcycle front suspension technology; however, in addition to the weight and bulkiness problems, the two telescoping assemblies also have to be fixed together in some manner, as through a "U" shaped yoke at the upper ends of the tubes to eliminate the attendant twisting problem that occurs with each telescoping assembly. This problem does not occur with motorcycles because the suspension fork assembly can be large and bulky so as to overcome this twisting problem. Additionally, there are linkage type systems, such as the aircraft landing gear scissors link, but this involves an additional coupling with its attendant weight, size and complexity.

It is desirable to provide a front suspension system or suspension fork for bicycles, and particularly for lightweight bicycles, which can bear a combination of loads comprising very high radial loads (e.g., from front to back) occasioned by braking, bumps and the like, while at the same time providing stable and tight rotational motion in steering of the front wheel through the suspension system from the handlebars.

SUMMARY OF THE INVENTION

The present invention provides an improved form of suspension system in the form of a suspension fork assembly for bicycles. The assembly comprises first and second steer tubes, one fitting and telescoping within the other, with one being coupled at an upper end to a handlebar stem of the bicycle, and the lower end of the other being coupled to the bicycle fork which receives the front wheel of the bicycle. These elongated inner and outer tubes are mounted in the head tube of the frame of the bicycle, and include a shock absorbing system within these tubes such as an oil-filled spring dampened internal shock absorbing element or system. The system also includes an improved shock absorbing system which is in the form of a cartridge cylinder which may be readily inserted within the telescoping assembly.

Of particular importance are axially extending longitudinal flat sections or "flats" which arc provided on opposing surfaces between the two tubes, along with a plurality of free floating needle bearings disposed on these flat sections to all but eliminate stiction. For example, the upper tube is an outer steer tube coupled to the handlebar stem, and the inside surface of this tube has a plurality, preferably four, of longitudinal flat sections provided therein. The lower tube has a like plurality of similar flat sections, and a plurality of needle bearings are arranged normal to the longitudinal axis of these tubes and suitably supported, so that the lower, inner tube can freely telescope in and out of the upper tube to provide the shock absorbing action. In addition to providing minimum friction between the two tubes, the flats and plurality of needle bearings serve to maintain the fixed relationship between the two tubes, and thus between the handlebars, fork and wheel, and function to transmit the torsional or rotary steering action from the handlebars to the fork and front wheel. While some arrangements have been proposed in the past using a plurality of ball bearings between inner and outer members of a suspension system, it has been found that the use of races with ball bearings is not satisfactory for carrying the various radial and torsional loads that occur. Moreover, costs of manufacture may be high due to the difficulties in achieving the desired fit and preload.

Accordingly, an object of the present invention is to provide an improved suspension assembly or components thereof. Certain of the embodiments may also provide one or more of the following objects:

Provide a new form of telescoping suspension assembly for a steerable member such as a fork.

Provide a new form of suspension assembly for bicycles.

Provide a bicycle fork suspension assembly which uses a plurality of needle bearings disposed between flat surfaces of mating telescoping tubes.

Provide a suspension assembly and assembly method which may be economically manufactured.

Provide an improved shock absorbing system for a suspension assembly which is adjustable and highly reliable, and which provides high performance.

Provide an improved shock absorbing system for a suspension assembly which is in a cartridge cylinder form that may be readily inserted within the telescoping assembly.

These and other objects and features of the present invention will become better understood through a consideration of the following description taken in conjunction with the drawings which follow.

BRIEF DESCRIPTION OF THE DRAWINGS

FIG. 1b is exploded perspective view of the connection between the structures 14 and 23 of FIG. 1a.

FIG. 2 is a detailed assembly drawing of an embodiment of the present invention, illustrating inner and outer steer tubes and sets of needle bearings arranged therebetween;

FIG. 3a is a view of the inner steer tube of the assembly of FIG. 2, and FIGS. 3b and 3c are respective end views thereof;

FIG. 15 is a perspective view of the inner tube with race inserts attached;

FIG. 16 is a front elevation view of the inner tube of FIG. 15;

FIG. 22 is a partial cross-sectional view of the cartridge cylinder and cartridge assembly of the suspension cartridge of FIG. 21;

FIG. 22A is a detailed view of the bulk head portion of the cartridge assembly of FIG. 22;

FIG. 25 is a top plan view of the piston shaft of FIG. 21;

FIG. 25A is a cross-sectional view of FIG. 25 taken along the line 25A—25A;

FIG. 25B is a cross-sectional view of the piston shaft of FIG. 25 taken along the line 25B—25B;

FIG. 25C is a cross-sectional view of the piston shaft of FIG. 25 taken along the line 25C—25C;

FIG. 25D is a detailed view of a portion of the piston shaft of FIG. 25;

DETAILED DESCRIPTION OF THE PREFERRED EMBODIMENTS

Figure 1A:
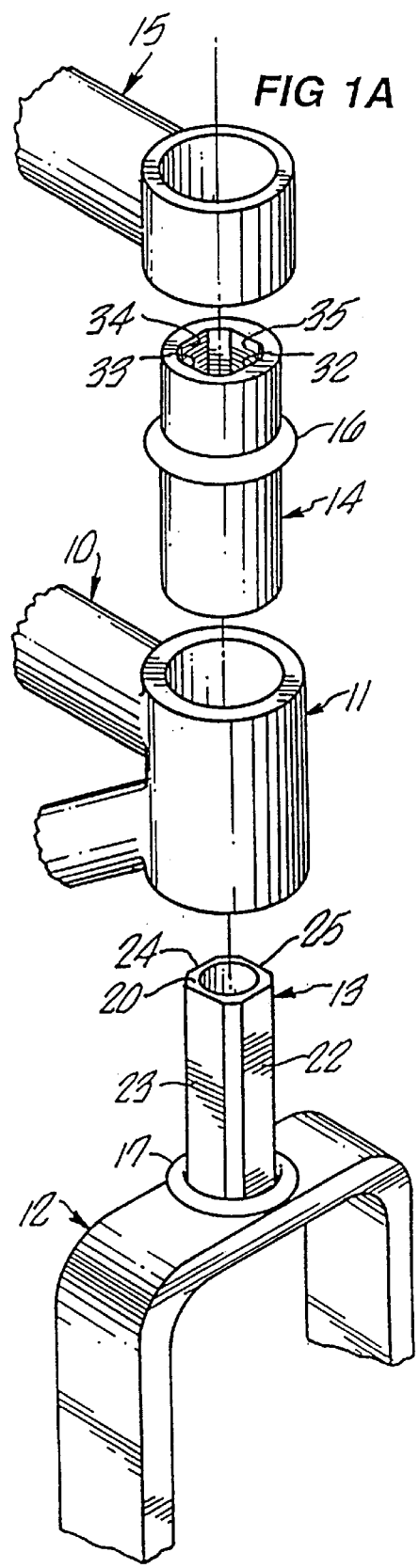
FIG. 1a is a simplified exploded perspective view illustrating a preferred form of the suspension support according to the present invention.
Figure 1B:
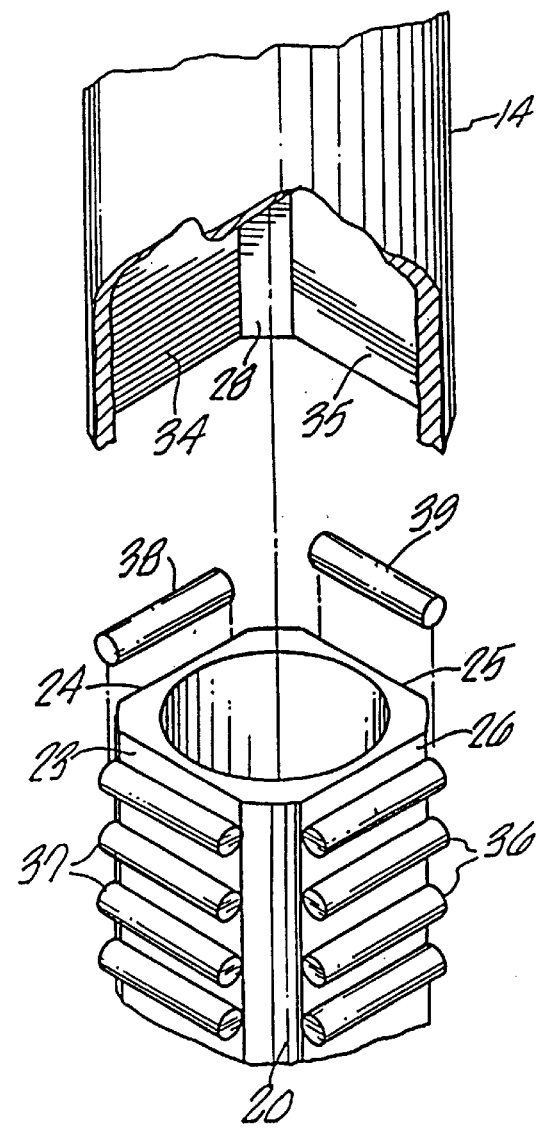

Turning now to the drawings, and first to FIG. 1, a bicycle frame 10 is shown (partial) along with a head tube 11. A fork 12 has an inner steer tube 13 affixed thereto and which extends upwardly through the head tube 11 into an upper outer steer tube 14. The upper end of the outer steer tube 14 is connected to a handlebar stem 15 to which handlebars (not shown) are attached. Upper and lower bearings 16 and 17 can be provided to journal the tube assembly 13–14 within the head tube 11 for steering rotation. The assembly of the tubes 13 and 14 is suitably connected together and retained within the head tube 11; and a suitable hydraulic or air shock system is mounted within these tubes 13–14, all as will become apparent subsequently.

The outer wall 20 of the lower or inner steer tube 13 has a plurality of axially extending longitudinal flat surfaces or "flats" 22–25. Preferably four such flats are provided, although three will suffice and a greater number than four can be used. The inner wall 28 of the upper or outer tube 14 has a like set of opposing flats 32–35. These flats on both tubes extend in the axial directions of the tubes. Four sets of needle bearings 36–39 are disposed between the respective flats of the inner and outer tubes 13–14, as generally illustrated in FIG. 1, and these needle bearings are disposed normal or perpendicular to the axial direction of the tubes 13 and 14, or consequently normal to a radial line extending from the center of the tubes. These needle bearings, which are disposed from the top to the bottom of each flat, are retained in a suitable cage (not shown in FIG. 1) which will be described later.

It will be apparent to those skilled in the art that the needle bearings 36–39 allow the inner tube 13 to freely slide axially or telescope with respect to the outer tube 14. Additionally, the needle bearings, in conjunction with the associated flats on the tubes 13 and 14, enable the steering torsional or rotary action to be imparted from handlebars connected to the handlebar stem 15 via the telescoping tubes 13 and 14 to the fork 12 and consequently to the front wheel (not shown) supported by the fork. The respective flats and needle bearings bear a combination of loads including very high radial loads from the fork 12 during movement over rough terrain and during braking and the like, while still stabilizing a rotational and torsional connection from the handlebars to the fork. No external coupling or linkage is needed to enable transmission of the rotational and torsional forces for steering, and the present suspension assembly can be made sufficiently strong, light and compact such that a single telescoping assembly can be provided for a bicycle fork without requiring a pair of telescoping assemblies. Sufficient longitudinal or axial travel can be provided, such as several centimeters. The length of the flats establishes the extent of telescoping action of the tubes. This assembly absorbs bumps, facilitates handling the bicycle while riding, is more controllable over rough conditions, and provides a tight positive steering action.

Turning now to a detailed discussion of an exemplary embodiment of a suspension fork according to the present invention, FIGS. 2 through 7 illustrate the details of a preferred construction. FIG. 2 is a cross-sectional view of the entire assembly, and FIGS. 3 through 7 illustrate major components thereof in further detail. FIG. 2 illustrates the inner steer tube 13 disposed coaxially within the outer steer tube 14, and shows two sets 36 and 38 of the four sets (36–39) of needle bearings disposed between these tubes. The upper and lower bearings 16 and 17 also are shown coupled to the tube 14 in FIG. 2, and these bearings support the suspension fork assembly within the head tube 11 of FIG. 1 in a conventional manner. FIG. 3 illustrates the inner steer tube 13 in detail and FIG. 4 illustrates the outer tube 14 in detail. FIGS. 5A–5D illustrate a bearing cage 42, four of which are used for holding the respective four sets of needle bearings 36–39 between the tubes 13 and 14. FIGS. 6A, 6B, 7A and 7B illustrate respective fixed and adjustable bearing races which are mounted within the outer steer tube 14 as will be discussed in more detail subsequently.

FIG. 2 also illustrates diagrammatically a hydraulic assembly 44 having a shock carriage assembly 45 and associated coil spring 46 and spring sleeve 47. The hydraulic assembly 44 includes a typical piston and valving arrangement (not shown) to provide an adjustable hydraulic shock action between the tubes 13 and 14.

The upper end (to the right as viewed in FIG. 2) of the outer steer tube 14 is threaded as illustrated for receiving an outer tube cap 50 which in turn receives a jack screw 51 held therein by a retainer screw 52. The lower end (to the left in FIG. 2) of the jack screw 51 has a collar 53 threaded thereon and engages an end of the spring 46. The upper end of the shock carriage 45 is threaded into the jack screw 51 and is secured by a nut 54. Although not shown in FIG. 2, the handlebars stem 15 of FIG. 1 is clamped around the upper end 56 of the outer steer tube 14. The jack screw 51 and associated components are adjustable so as to allow the preload of the hydraulic shock assembly to be adjusted, such as to adjust the same for the rider's weight.

The needle bearing cages 42 and needle bearings 36–39 can be retained between the tubes 13 and 14 in any suitable manner. In the exemplary embodiment illustrated in FIG. 2, the upper end of the spring sleeve 47 includes a shoulder 57 against which the upper end of the bearing cages 42 abut, and the lower ends thereof are retained by a lower collar 58 which is threaded onto the lower end 59 of the outer tube 14. A boot 60 may be attached to the collar 58, and a bottom-out bumper 61 can be provided on the inner tube 13, as shown. The boot minimizes collection of dirt and moisture on the lower exposed portion 64 of the tube 13. The lower end 65 of the inner tube 13 is secured to the fork 12 of FIG. 1 in any suitable manner as will be apparent to those skilled in the art.

FIG. 3 illustrates in detail the configuration of the inner tube 13 and FIG. 4 illustrates in detail the configuration of the outer tube 14. The inner tube 13 is essentially a hollow cylinder as illustrated in FIGS. 2 and 3, but has formed on its outer wall 20 four axially extending longitudinal flat surfaces, or flats, 22 through 25 as previously discussed with reference to FIG. 1. An exemplary outer diameter of the tube 13 is 1.125 inches (28.58 mm) and an exemplary length of the tube 13 is 8.17 inches, with the flats being 5.67 inches (144 mm) long and one-half inch (12.7 mm) wide, and the cylindrical end 62 being 2.5 inches (63.5 mm) long. The tube 13 is formed of steel, and can be formed from Nitriloy or equivalent, and with the flats 22–25 being hardened through the use of copper masking techniques as used in the automotive industry. Since this tube 13 is the most highly stressed part of the assembly, it is important that it be formed of a material and in a manner such that it will bend rather than break under high stresses.

Figure 6B:
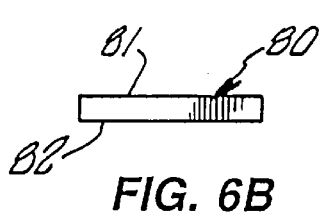
FIGS. 6a and 6b illustrate views of a fixed race insert used in the assembly of FIG. 2.
Figure 6A:
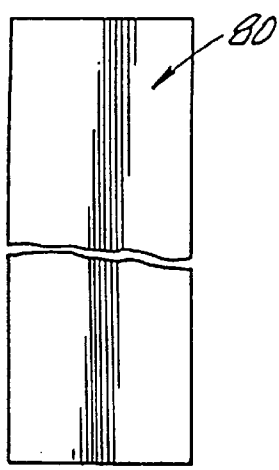
Figure 7B:
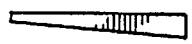
FIGS. 7a and 7b are similar views of an adjustable race insert used in the assembly shown in FIG. 2.
Figure 7A:
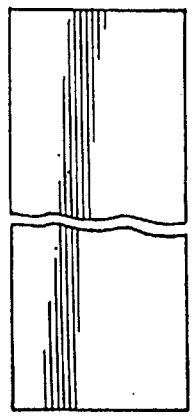

The outer tube 14 as shown in FIG. 4 comprises a hollow cylinder for mounting in the bearings 16 and 17 within the head tube 11 as previously discussed. The inner wall 28 of this tube has formed therein four longitudinally disposed channels 72–75 as seen in FIGS. 4b–4d. These channels are formed to receive therein the bearing race inserts 80 and 84 shown in FIGS. 6 and 7. The channels 72–25 also have outer walls 72a–b–75a–b (note FIG. 4b) to receive the bearing cages 42. The race insert 80 shown in FIG. 6 is termed herein a "fixed" race insert and has a consistent rectangular cross section with parallel sides or faces 81 and 82 as seen in FIG. 6b. Two of these race inserts 80 are disposed in respective channels 73 and 74. On the other hand, each of the longitudinal channels 72 and 75 receives the race insert 84 of FIGS. 7A, 7B which is termed an "adjustable" race insert. These adjustable race inserts facilitate assembly and provide a way to adjust bearing clearance after assembly and is explained below. An exemplary length for the tube 14 is 7.66 inches (195 mm) and outer diameter of the central portion is 1.5 inches (38 mm).

Figure 4B:
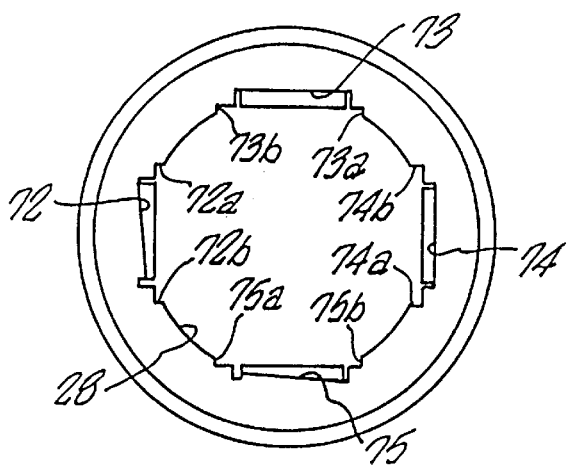
FIG. 4b is an end view and FIGS. 4c–4d are cross-sectional views taken along respective lines 4c—4c and 4d—4d thereof, and these views illustrate an adjustable race arrangement.
Figure 4D:
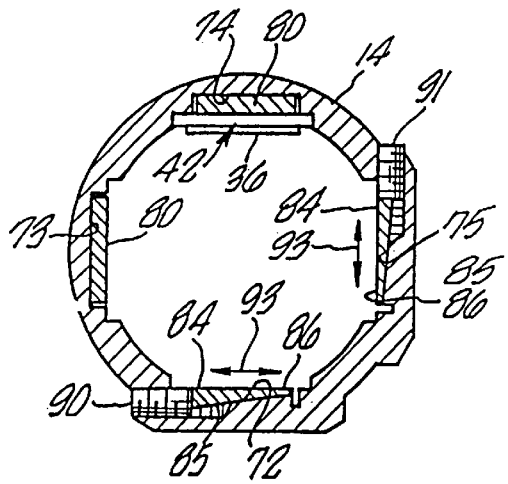
Figure 4A:
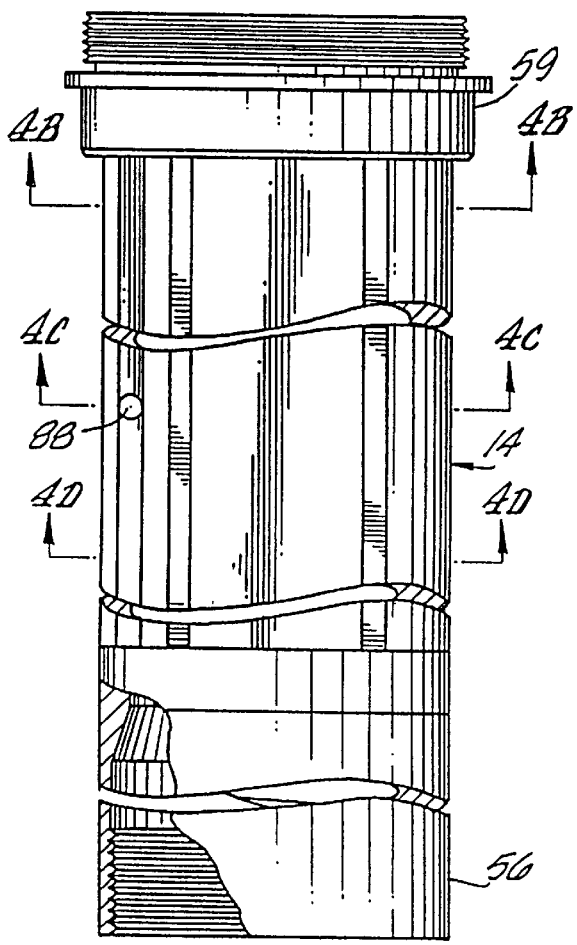
FIG. 4a illustrates the outer steer tube of the assembly of FIG. 2.
Figure 4C:
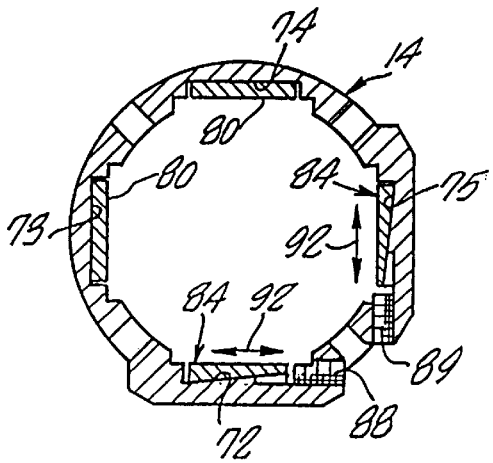
Figure 5A:
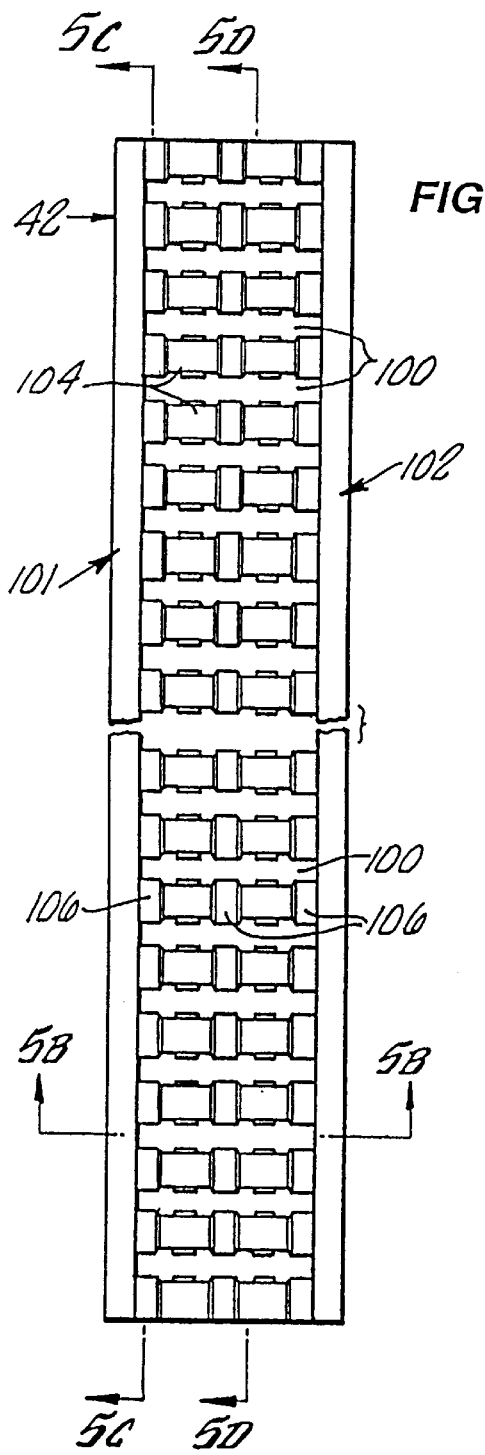
FIG. 5a is a view of a bearing cage of the assembly of FIG. 2, and FIGS. 5b–5d are cross-sectional views taken along respective lines 5b—5b, 5c—5c and 5d—5d thereof.
Figure 5C:
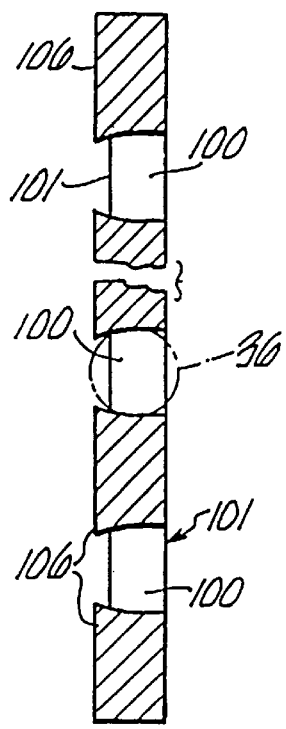
Figure 5D:
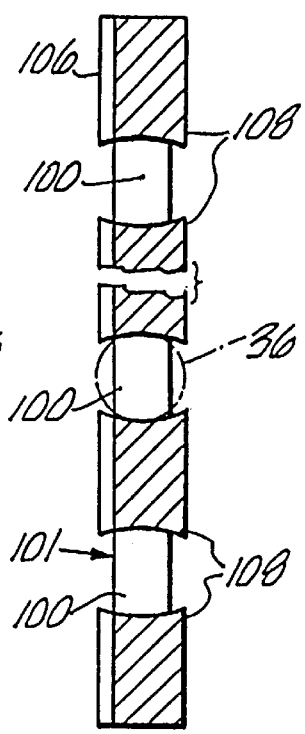
Figure 5B:
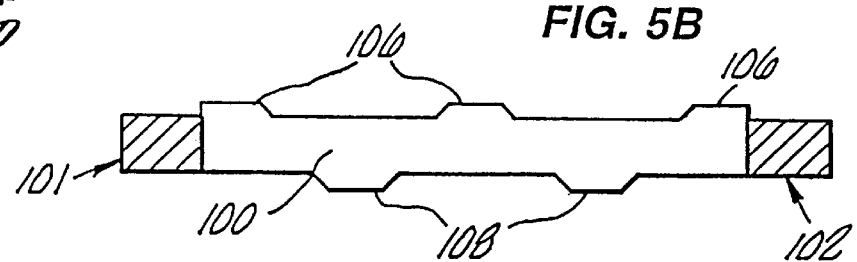

It can be seen in FIGS. 4b–4d that the channels 73 and 74 for the fixed race insert 80 are not only parallel to the axis of the tube 14 but are perpendicular to a radial line extending through the center of the tube 14.

On the other hand, the channels 72 and 75 are disposed at a slight angle (e.g., approximately 4°) with respect to a normal to a radial line. Furthermore, the adjustable race inserts 84 of FIG. 7 have a similar inclined side or face 85 which mates with the surfaces of the channels 72 and 75 so that the two inclined surfaces (i. e., 72 and 85 and 75 and 85) mate and cooperate to allow radial adjustment of bearing clearance. Note FIGS. 4c and 4d which are cross-sectional views along the lines 4c—4c and 4d—4d of FIG. 4a and illustrate threaded holes 88–91 for receiving set screws (not shown) to allow a small adjustment of the adjustable race inserts 84 in the direction of the arrows 92 and 93 which, as will be apparent to those skilled in the art, causes the inclined surfaces (i.e., 72 and 85 and 75 and 85) to move along one another thereby causing the normal surfaces 86 of the adjustable race inserts to move radially in and out with respect to the axis of the tube 14 so as to take up bearing clearance. The four sets of bearing cages and needle bearings are disposed on the respective race inserts 80 and 84, only one bearing cage 42 being shown in FIG. 4d.

Holes may be provided at suitable locations in the wall of outer tube 14 to serve as grease ports.

FIG. 5 illustrates the bearing cage 42 that can be used to hold each of the sets of the needle bearings 36–39 between the flats 22–25 of the inner steer tube 13 and the flats provided by the normal surfaces 82 and 86 of the respective race inserts 82 and 84. The bearing cage 42 shown in FIG. 5 may be molded from a suitable thermoplastic material, and has slots 100 for receiving the needle bearings. The cage includes an outer frame structure 101 and 102 and a plurality of cross-members 104 extending therebetween and forming the needle bearing slots or spaces 100. The cross members 104 are configured as best seen in FIG. 5b–5d, and have inwardly curved upper members 106 (FIG. 5c) and inwardly curved lower members 108 (FIG. 5d) for partially encircling the needle bearings and retaining them within the slots 100. In the present exemplary embodiment, each bearing cage 42 supports sixty-six needle bearings in the slots 100.

Figure 8:
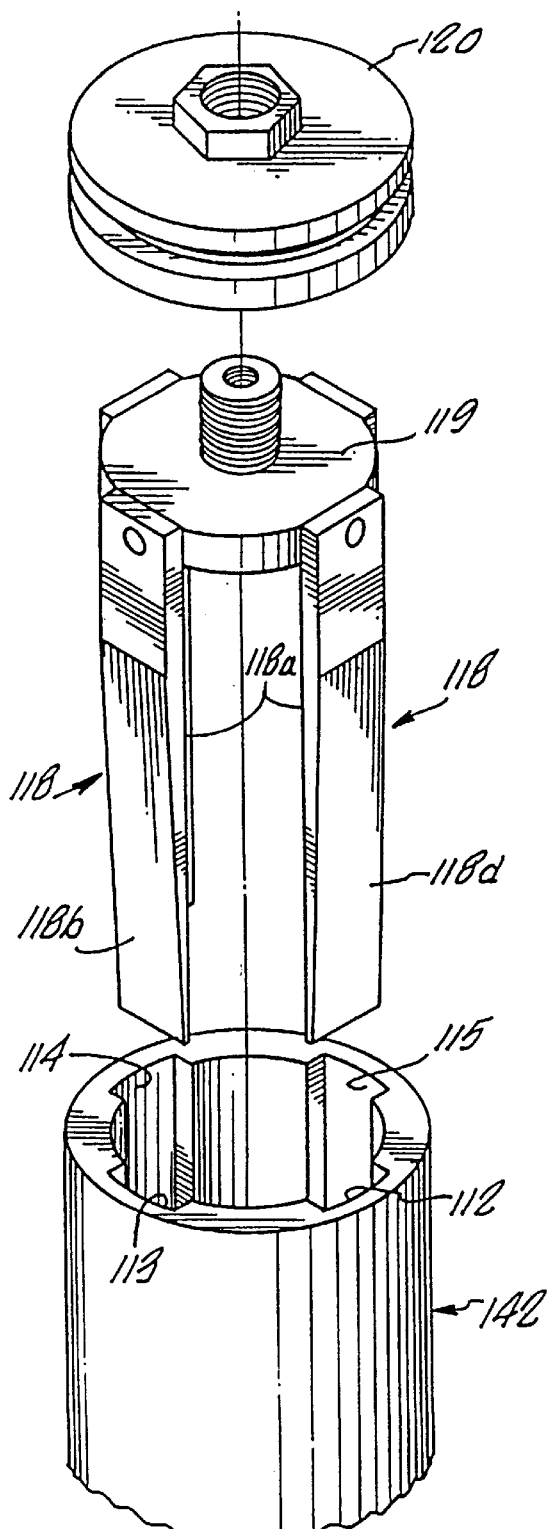
FIG. 8 is a perspective view of an alternative manner for providing an adjustable race for a suspension fork according to the present invention.

FIG. 8 shows an alternative embodiment for adjusting bearing clearance in which an upper end of an outer steer tube 14a has four axially extending longitudinal channels 112 through 115. Four adjustable race inserts 1 18 are secured to an upper collar 119 which in turn can be adjustably connected to a cap 120. The cap 120 can be similar to the outer tube cap 50 of FIG. 2, and the handlebar stem (not shown) can be attached to the upper end 20 of the tube 14a.

The races 118 shown in FIG. 8 have inwardly facing flat faces 118a which are disposed normal to a radial line from the center axis of the tube 14a. An inner tube (not shown) is disposed within the outer tube 14a, with mating flats, along with suitable needle bearings and bearing cages similar to the structures previously described.

The opposite outer surfaces 118b of at least two of the race inserts 118 are inclined from top to bottom wherein the upper end is thicker than the lower end as shown. Two or more of the channels 112–115 can have a similar mating relationship wherein these channels are inclined outwardly from the bottom to the top of the tube 14a. With this construction, movement of the set of race inserts 118 downwardly into the tube 14a against the inclined channels 112–115 causes the inner normal surfaces 118a of the inclined race inserts to move radially inward to thereby accommodate and adjust for bearing clearance. This arrangement provides another way for adjusting or compensating for bearing clearance and thus involves movement of some or all of race inserts 118 in an axial direction for bearing compensation.

Figure 9:
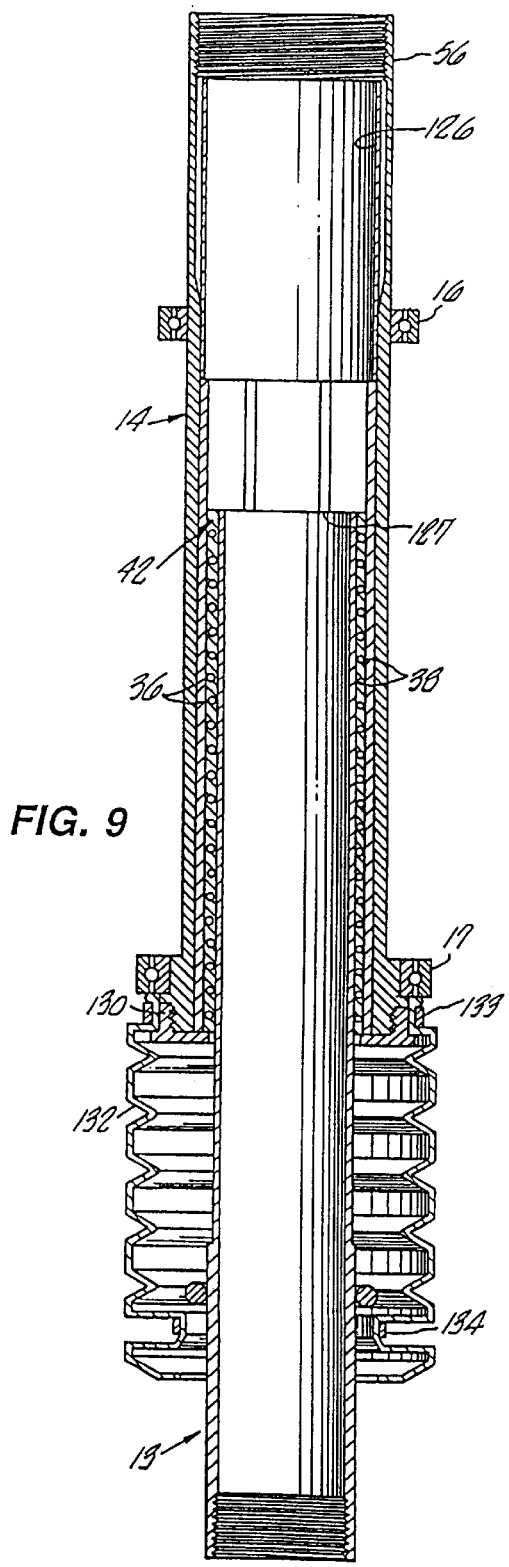
FIG. 9 is a view, similar to FIG. 2, of an alternative suspension assembly which can incorporate an air spring.
Figure 10B:
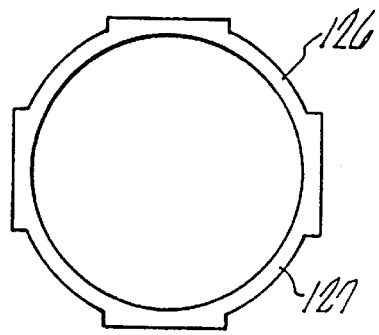
FIG. 10b is an end view thereof, for use in the assembly of FIG. 9.
Figure 10A:
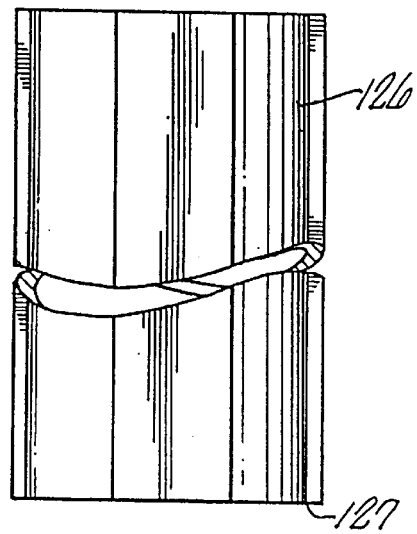
FIG. 10a is a view of a suspension fork race retainer.

FIGS. 9 and 10 illustrate an alternative embodiment which is almost the same as that shown in FIG. 2 but which is designed to accommodate an internal air spring system (not shown). In this embodiment, the inner tube 13 and outer tube 14 are like those shown in FIG. 2. Likewise, the assembly is mounted in bearings 16 and 17, and the assembly contains the same four sets of needle bearings 36–39, only two of which 36 and 38 are seen in this Figure. Like bearing cages 42 also are used, but the upper or right hand ends as seen in FIG. 9 are retained by a cylindrical race retainer 126 and which is shown in greater detail in FIG. 10. This race retainer 126 fits within the upper end of the outer steer tube 14, and has a lower end forming a shoulder 127 against which the upper ends\of the bearing cages 42 are retained. The race retainer is retained in the upper end 56 of the tube 14 by a tube cap (not shown) and related components similar to the tube cap 50 of FIG. 2. The lower ends of the bearing cages 42 are retained by a collar 130 similar to the collar 58 of FIG. 2. A boot 132 is provided and is retained by cable ties 133–134.

FIGS. 11–21 illustrate an embodiment and construction method for a preferred suspension assembly. As best shown in the perspective view of FIG. 11, the telescoping assembly 210 is comprised of an inner tube 213 and an outer tube 214 which are coaxially arranged with the inner tube 213 coaxially translating within or telescoping out from the outer tube 214. Similar to previous embodiments, low friction telescoping movement is provided through four rectangular bearing cages (described more fully below with respect to FIGS. 19–21) spaced about the inner tube 213 in the annular space between the outer tube 214 and the inner tube 213.

Figure 12:
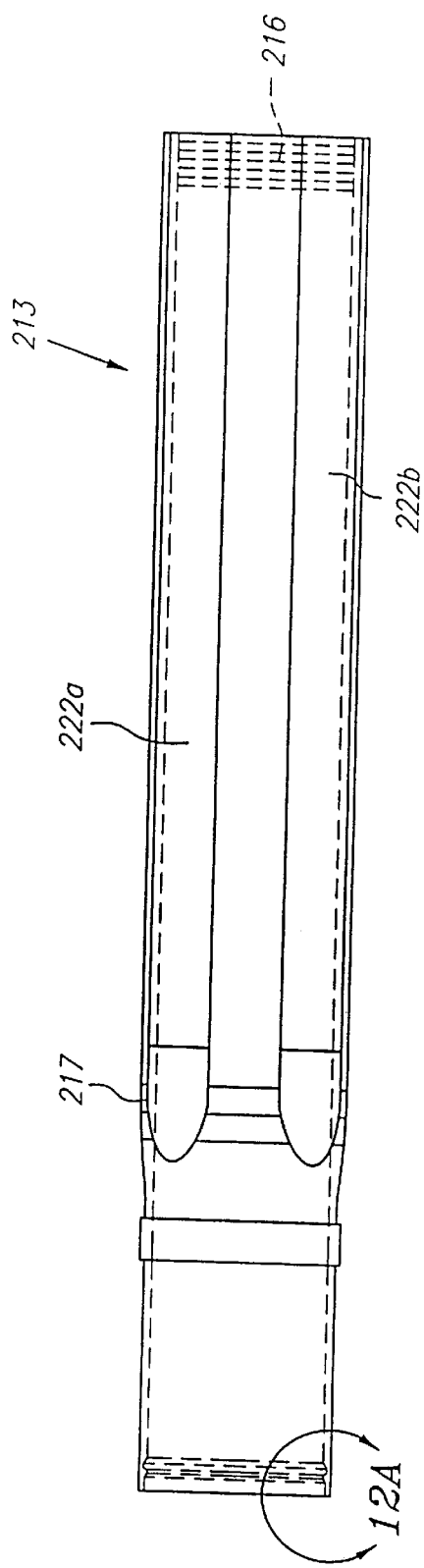
FIG. 12 is a side elevation view showing details of the inner tube portion of the suspension assembly FIG. 11.
Figure 12A:
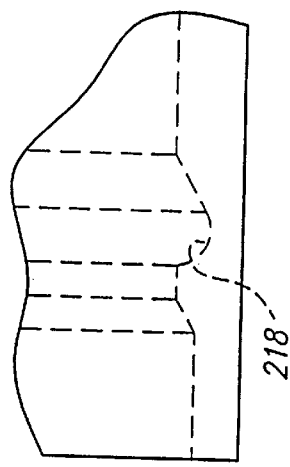
FIG. 12A is a detailed view of the end portion of the inner tube of FIG. 12.
Figure 14:
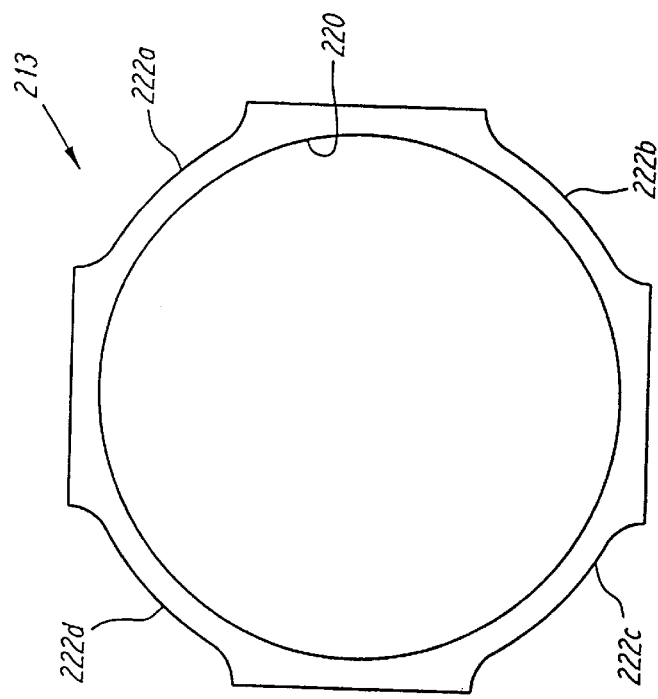
FIG. 14 is a front end view of the inner tube of FIG. 13.
Figure 13:
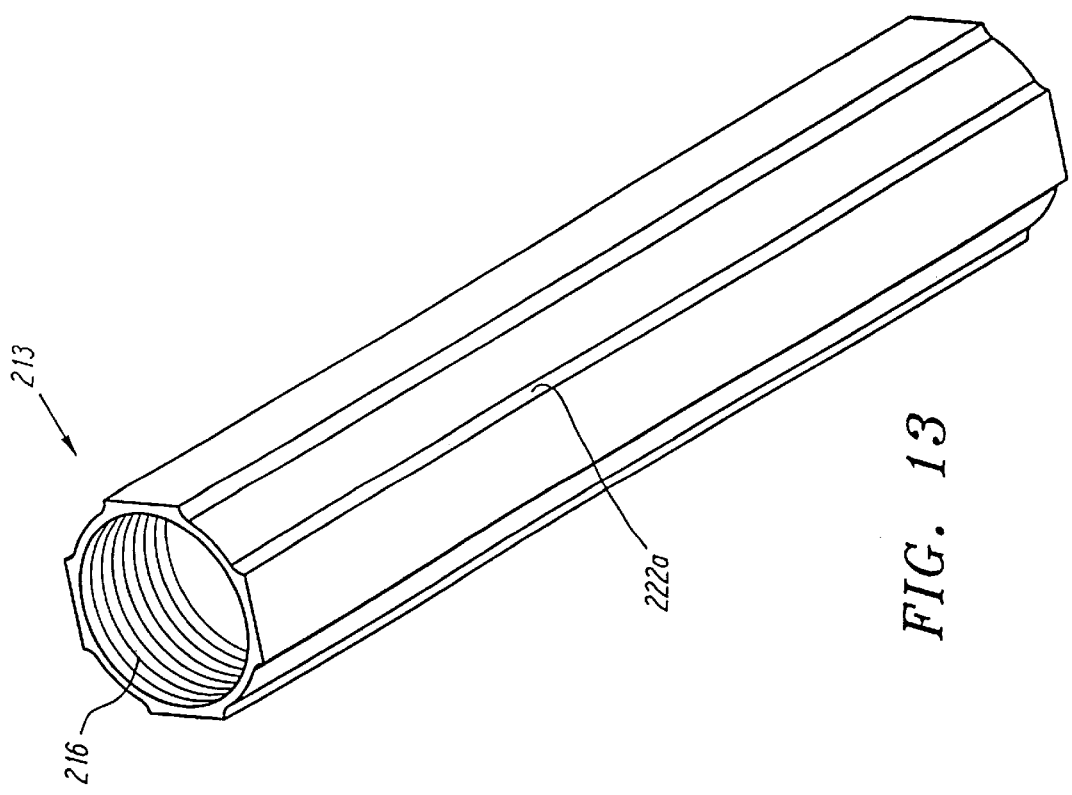
FIG. 13 is a perspective view of the other end portion of the inner tube of FIG. 12.

In order to provide the desired wear and performance qualities, the surfaces on the inner tube 213 and outer tube 214 which are contacted by the bearing cages are preferably hardened or constructed from a sufficiently hard metal material. As shown in FIGS. 12–16, the inner tube 213 includes internal thread 216 on the first end thereof and a groove 218 along an inner surface at the second end thereof (as best shown in FIG. 12A). The inner tube 213 has a central passage 220 of generally circular cross section and four recessed portions or channels 222a, 222b, 222c, 222d which extend axially from the first end at the threads 216 approximately two thirds of the length of the inner tube 213. A respective bearing race insert 224a–d is installed in each respective recess 22a–d. Each race insert 224a–d is approximately 0.016 inches (0.41 mm) thick and extends radially outward from the respective recess. Race inserts 224a–d may be attached to the inner tube 213 by small spot welds at extreme ends of the race inserts to fix the race insert to the inner tube 213 and prevent wandering. The race inserts 224a–d are constructed out of hard material or may have a hard outer surface such as steel which has its outside surface hardened by a nitriding process.

Figure 19:
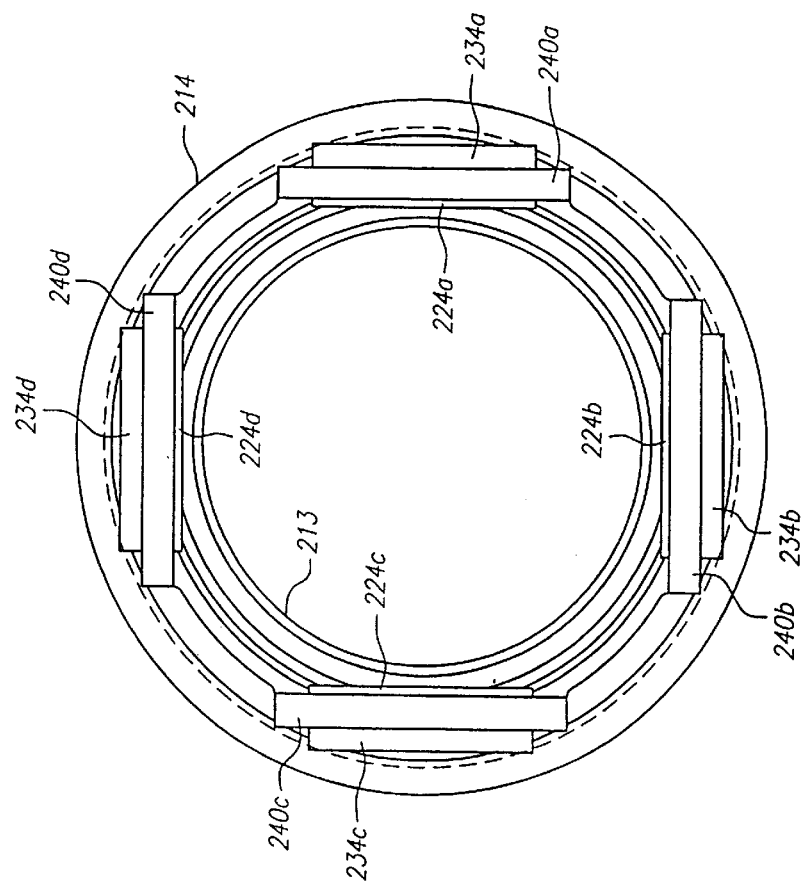
FIG. 19 is a cross-sectional view of the telescoping assembly of FIG. 11 taken along the line 19—19.
Figure 11:
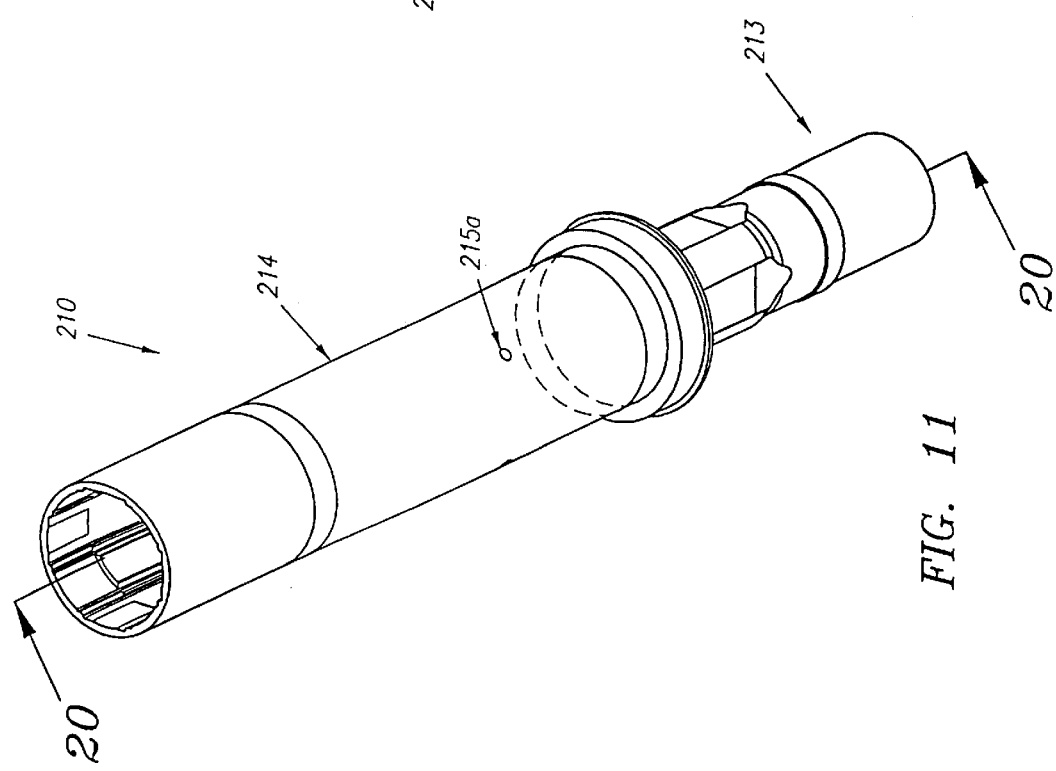
FIG. 11 is a perspective view of an alternative telescoping suspension assembly.
Figure 17:
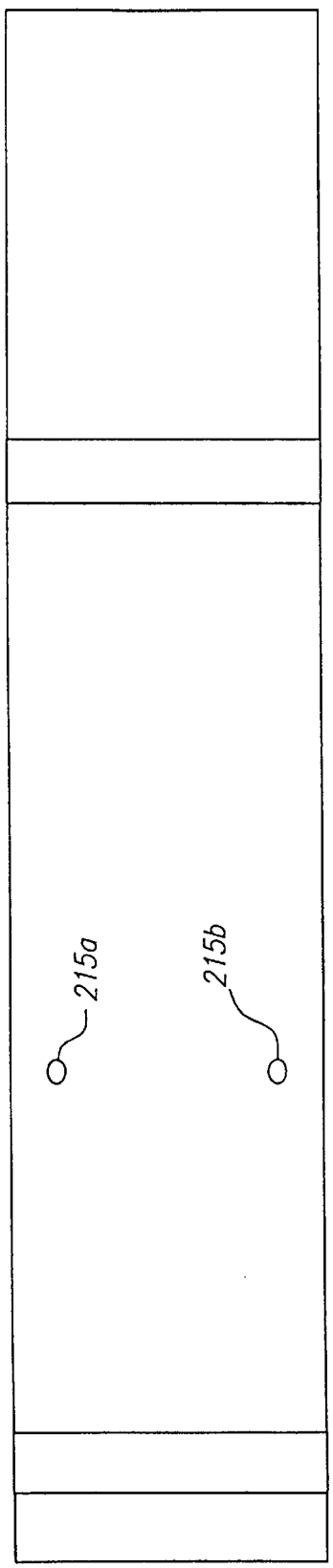
FIG. 17 is a side elevation view of the outer steerer tube of FIG. 11.
Figure 18:
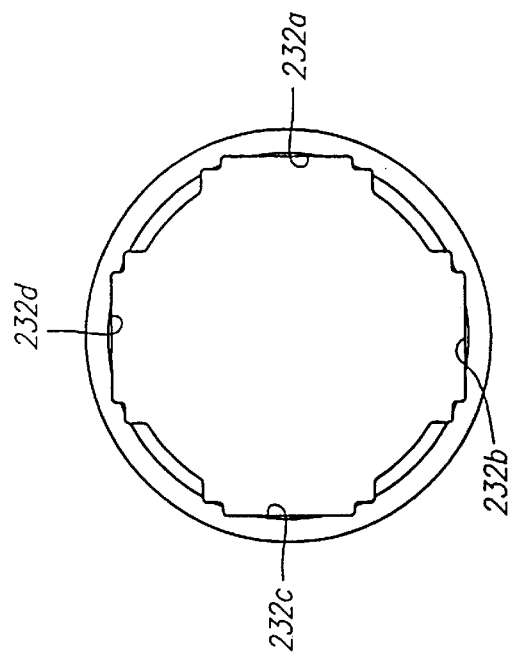
FIG. 18 is a rear plan view of the outer steerer tube of FIG. 17.

Referring to FIGS. 17–19, the outer steerer tube 214 has a plurality of longitudinal inner recesses or channels 232a, 232b, 232c, 232d spaced about its inner periphery and extending the length of the outer steerer tube 214. A respective outer race insert 234a, 234b, 234c, 234d is installed in each corresponding recess 232a–d in the outer tube 214. A respective bearing cage 240a–d is positioned between respective inner and outer race inserts.

As an example, bearing cage 240a is positioned between inner race insert 224a and outer race insert 234a. The entire assembly is press fit together with a desired preload on the bearings.

Figure 20:
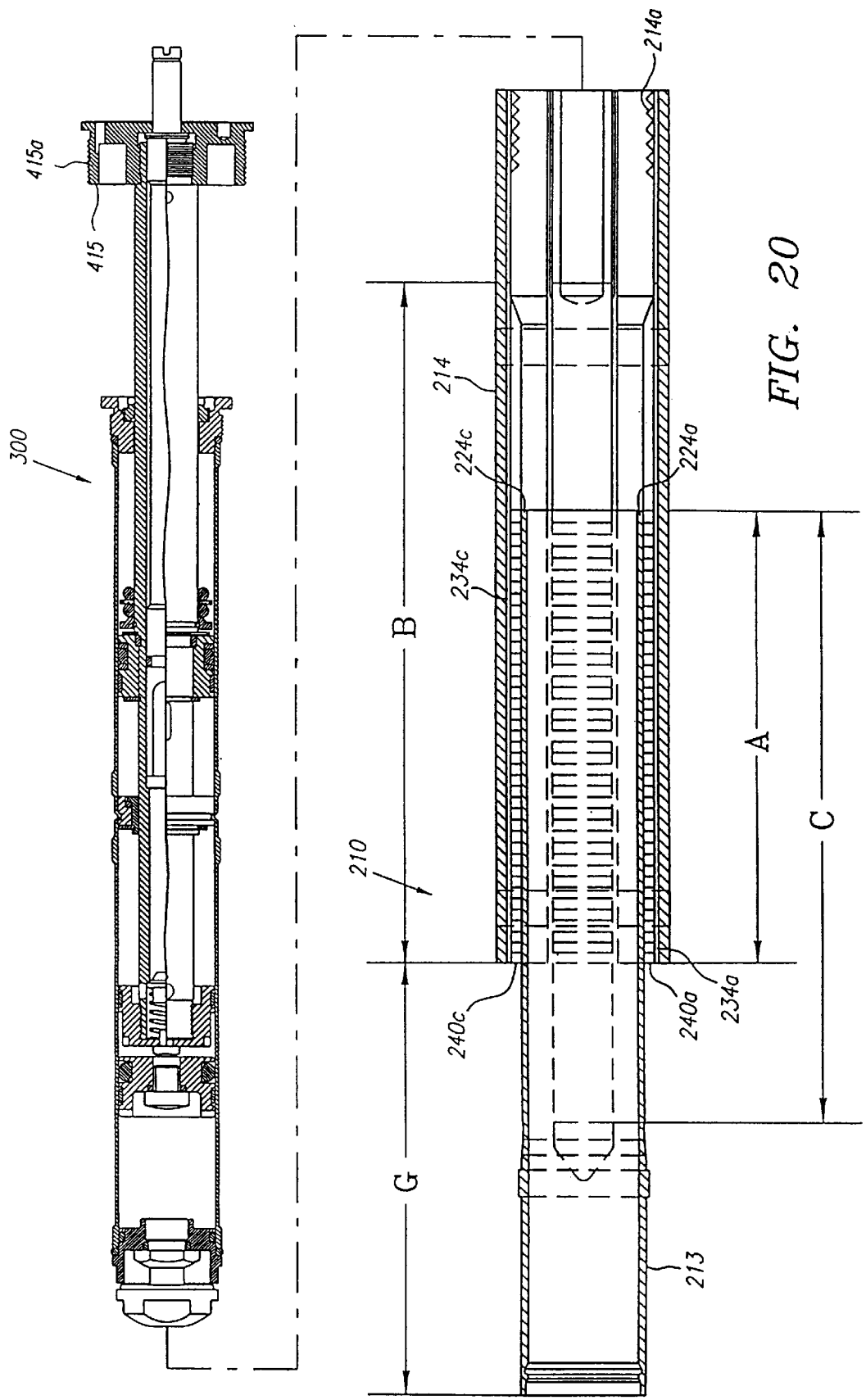
FIG. 20 is a front end view of the telescoping assembly of FIG. 11 in the fully extended position.
Figure 20A:
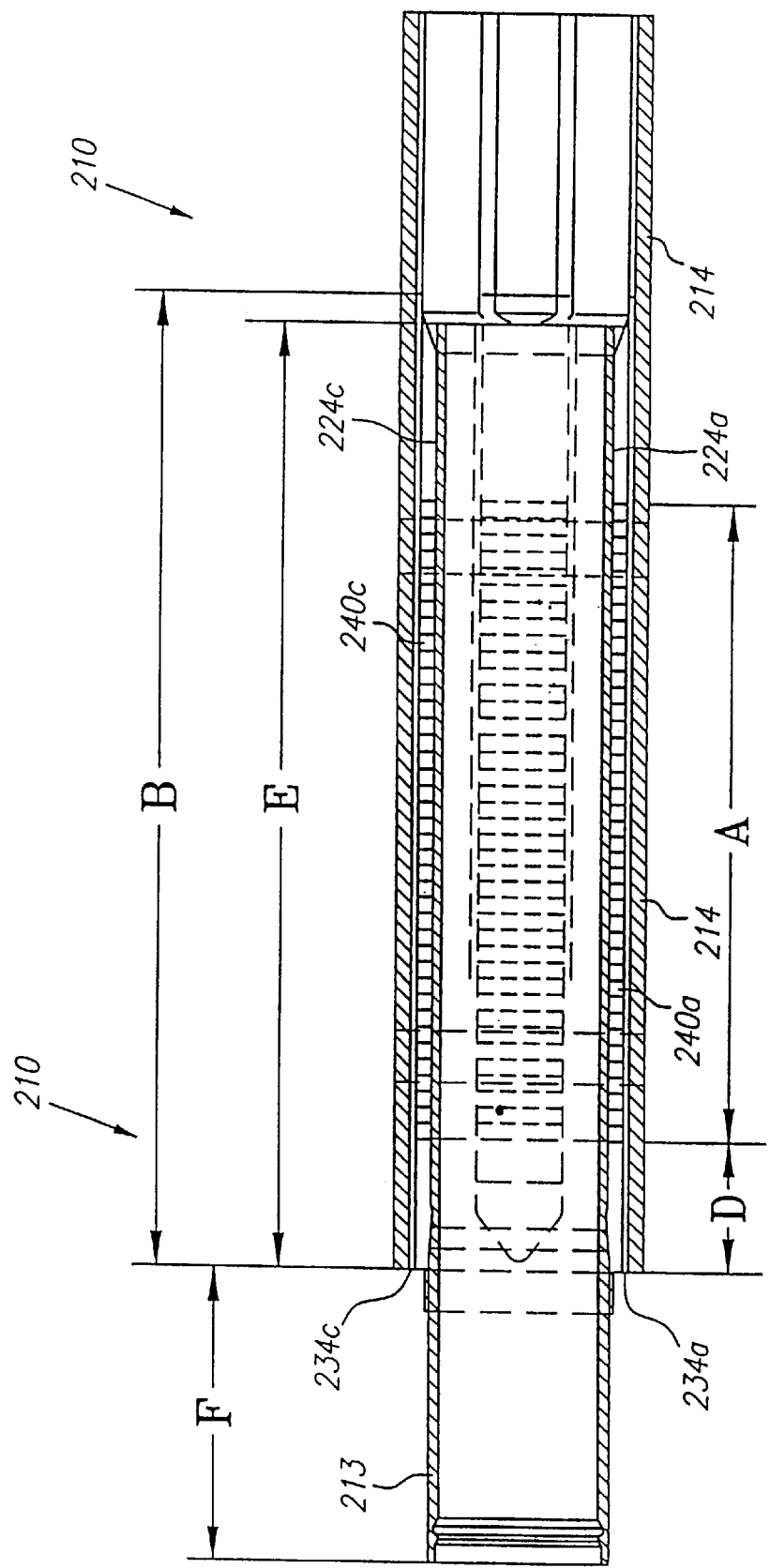
FIG. 20A is a side elevation view of the telescoping assembly in the fully compressed position.

As shown in FIGS. 20 and 20A, the bearing cages 240a–d are in floating arrangement between the inner tube 213 and the outer tube 214. FIG. 20 illustrates the assembly 210 in the fully extended position and FIG. 20A illustrates the assembly 210 in the fully compressed condition. The desired preload is imposed during assembly to minimize lateral play between the inner tube 213 and the outer tube 214.

In order to provide the desired preload yet avoid overloading which would cause undue friction to any telescoping motion, the assembly method may provide a precise fit of the components. To achieve a precise fit, the tolerances to the inner tube 213 (outer diameters) and the outer tube 214 (inner diameters), as well as the thicknesses of the bearing cages 240a–d and the race inserts 234a–d and 224a–d would have to be held to very small amounts. Requiring such a low tolerance to the inner tube 213 and outer tube 214 would greatly increase material costs. In the previous embodiment disclosed, this adjustment in the manufacture was by means of ramped race inserts. In this preferred manufacturing method, the assembler is provided with a plurality of race inserts of varying thicknesses. These race inserts are readily manufactured to strict tolerances or each race insert may merely be individually measured and its thickness marked thereon for later use.

The attachable race construction provides that only the surfaces of the race inserts such as inner race inserts 234a–d which come in contact with the bearings 240a–d need be of hardened material. The remaining components such as the inner tube 213 and the outer tube 214 may be of more ductile material which is more easily machined. The race insert themselves need not be machined and are not required to be manufactured to close tolerances, but only need be manufactured in a range of thicknesses such as from 0.015 to 0.020 inches (0.38–51 mm) for the thicknesses of the inner race inserts 234a–d.

Alternate designs may be employed within this construction and method. For example, though four bearing cage/bearing race sets are shown at 90° intervals about the circumference, a design with three bearing cage/bearing race sets spaced at 120° intervals about the circumference may also be employed and readily implemented by one skilled in the art given the disclosure herein. In such a three set design, one of the race sets should be positioned in the front or rear (preferably the rear) of the tubes (that is bisected by the central longitudinal plane along the steering axis) to accommodate the bending moment acting on the structure. Other cylindrical or clam shell configurations may also be employed.

In the four bearing cage/bearing race set design, the sets are spaced at 90° intervals with front and back sets bisected by the central longitudinal plane along the steering axis. Alternatively, the sets may be rotated 45° (about the tube axis) but remaining symmetrical about the central longitudinal plane (along the steering axis).

Figure 21:
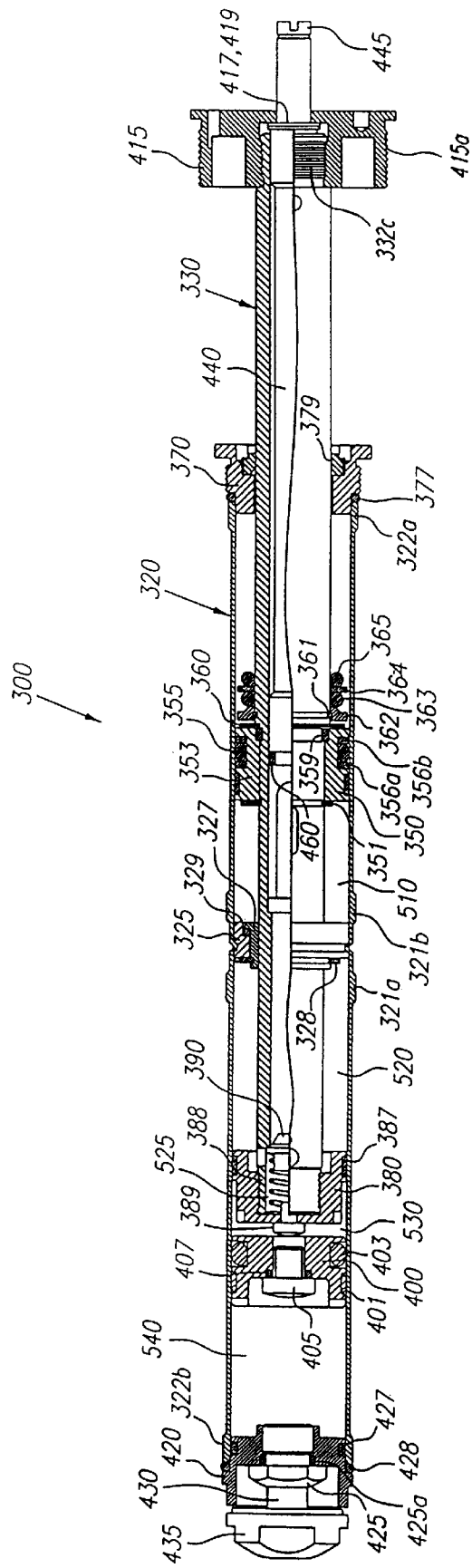
FIG. 21 is a side elevation view in partial cross-section of a preferred shock absorber cartridge for use in the suspension system of the present invention.

Though the inner tube 213 shown with a round inner tubular cavity, the cavity may be square shaped and still accommodate the shock absorber cartridge, Similarly, the outer tube 214 may comprise a square shape inner cavity, and in such an embodiment, the inner tube 213 would also preferably be comprised of a square tube shape to facilitate race insert assemblage. FIG. 20 illustrates a cartridge type shock absorber system 300 (details of which are shown in FIG. 21) as may be inserted within the assembly 210.

Following is the preferred method for construction of the attached race assembly.

Step One: In first instance, the outer tube 214 is procured and the four outer race inserts 234a–d are placed in respective slots 232a–d and held in place by a suitable means such as a spring loaded fixture.

Step Two: A precise measurement is taken between respective opposing surfaces of the race inserts, namely a first measurement between race inserts 234a and 234c and then a second measurement between race inserts 234b and 234d. A front side is arbitrarily chosen and marked as such, we will presume for this example that the front corresponds to race insert 234a and is marked accordingly.

Step 3: Take the inner tube 213 and place the inner race inserts 224a–d and hold them in place by a suitable device such as a spring loaded mechanism or a rubber band or the like. Arbitrarily choosing a front race insert as say 224a, outer diameter measurements are taken with a micrometer.

Step 4: For each direction pair which has been measured (that is, each front-back and each left-right) for the diameter of the inner race inserts, add two diameters of needle bearings to each diametrical measurement made resulting in measurement A for front-back diameter and amount B for the left-right measurement.

Subtract A from the inner diameter front-back measurement from Step 2 and obtain a value X. Subtract B from the inner diameter left-right measurement from Step 2 and obtain value Y. The values of X and Y will therefore be the diametrical fit or clearance of the unit.

Step 5: It is desirable to have an interference (as opposed to clearance) fit otherwise there will be wobble within the fork. The desired range is as follows:

X=0.002–0.0025 inches (0.051–0.0635 mm)

Y=0.001–0.0015 inches (0.0254–0.0381 mm)

Step 6: To provide the desired fit, if the measured amount does not meet the appropriate desired range, one of the race inserts from the pair is removed and replaced with another race insert of either greater or lesser thickness as required to achieve the desired interference fit. For example, if the value for X was determined to be 0.003 inches (0.0762 mm), one of the race inserts would be removed and another race insert of 0.001 inches (0.0254 mm) less would be installed in its place.

Step 7: Using a suitable fixture element supporting the bearing cages 240a–d position the cages between the inner and outer race inserts approximately half way in a position overlapping the inner tube 213.

Step 8: The inner tube 213 and the outer tube 214 are aligned according to their respective front sides and the outer tube is slid over the bearing/inner tube assembly with the desired press fit so as to achieve the desired initial position for the bearing cages relative to the inner and outer tubes.

In an alternative assembly method and design, the grooves on the steel inner tube 213 may be eliminated and the race inserts merely spot welded in place. Spot welding is not required when grooves are provided and the race inserts are fit within the grooves.

In an alternate assembly method, the assembler measures the actual dimensions of the inner tube 213 and the outer tube 214 (front to back; left to right) along with the actual thickness of the bearing cages 240a–d. The assembler then selects (a) inner and outer race insert pairs 224a,c–234a,c which provide the desired front to back clearance and (b) inner and outer race insert pairs 224b,d–234b,d which provide the desired left to right clearance. The result will be an assembly with a precise clearance which when assembled provides the desired preload.

The bearings 240a–d are floating, that is they are not fixed to either the inner tube 213 or the outer tube 214. As shown in FIGS. 20 and 20A, the axial position of the bearing cages 240a–d (having a length "A") is selected such that they are contained between the inner tube 213 and the outer tube 214. When the assembly is at full extension (see FIG. 20) the left most end of the bearing cages 240a–d do not extend outside of the outer tube 214. Also at full extension, the right most end of the bearing cages 240a–d do not extend past the right most end of the inner tube 213. When the assembly is at full compression (see FIG. 20A) the bearing cages 240a–d translate inwardly (to the left) an amount "C" do not extend outside of the outer tube 214. Also at full extension, the right most end of the bearing cages 240a–d do not extend past the right most end of the inner tube 213. Dimensions for the preferred embodiment are provided as follows:

| Letter Symbol | Element | Length Dimension |
| --- | --- | --- |
| A | bearing cages | 4.0 in (102 mm) |
| B | outer race inserts | 7.25 in (184 mm) |
| C | inner race inserts | 5.25 in (133.35 mm) |
| D | bearing cage travel | 1.0 in (25.4 mm) |
| E | tube overlap (full compression) | 5.856 in (148.74 mm) |
| F | exposed inner tube (full compression) | 2.064 in (52.43 mm) |
| G | exposed inner tube (full extension) | 3.939 in (100.05 mm) |

Improved Suspension System

The preferred embodiment for the suspension assembly also includes an improved shock absorbing system 300 illustrated in FIGS. 20–32. The preferred stock absorbing system is a self-contained cartridge type shock absorber disposed within the inner tube 213 and the outer tube 214 such that the shock absorber is removable as a unit. The figures are drawn relatively to scale and reflect the preferred embodiment. As best shown in FIGS. 21 and 22, the shock absorber system 300 is comprised of an outer cartridge housing 320 with an internal piston shaft 330 connected to an upper piston 350 and a lower piston 380. A fixed bulkhead 325 divides the hydraulic fluid into two chambers, an upper chamber 510 and a lower chamber 520. Compression of the piston passes fluid through a suitable orifice (which is described in detail below) between the upper compartment 510 and the lower compartment 520 to provide the shock absorber mechanism. A fluid air/oil separator piston 400 is provided to ensure separation between the air in the air spring chamber 540 and the lower fluid chamber 520. The separator piston 400 is separate from the second piston 380, that is, the piston .400 is not physically connected thereto and may move axially relative to the second piston 380. An intermediate fluid chamber 530 is formed between the floating piston 400 and the lower piston 380 to allow for thermal expansion of the hydraulic fluid in chambers 510, 520. A gas charge is provided into the air chamber 540 through a Schraeder air valve 430 (a valve actuable by a standard bicycle pump) located within the lower gland or plug 420 within the second end 322b of the cartridge 320. A suitable air charge may then be selectively provided through the valve 430 by a high pressure bicycle pump in a range of 100–150 psi (690–1034 kN/m$^2$). An end cap 435 may be installed on the end of the unit to protect the air valve 430 from dirt or damage.

As best shown in FIGS. 21–22, the main cartridge housing 320 is comprised of a central section 321 with first and second ends 322a, 322b. As shown in detail in FIG. 22A, the central portion of the cartridge wall 321 has an inwardly protruding lip 324 against which the bulkhead 325 is installed. A bulkhead bushing 327 is installed between the bulkhead 325 and the piston shaft 330 with an O-ring 329 positioned therebetween to prevent leakage through the two components between the first chamber 510 and the second chamber 520. The O-ring 329 accommodates for lack of concentricity between the shaft and the bulkhead.

Figure 23:
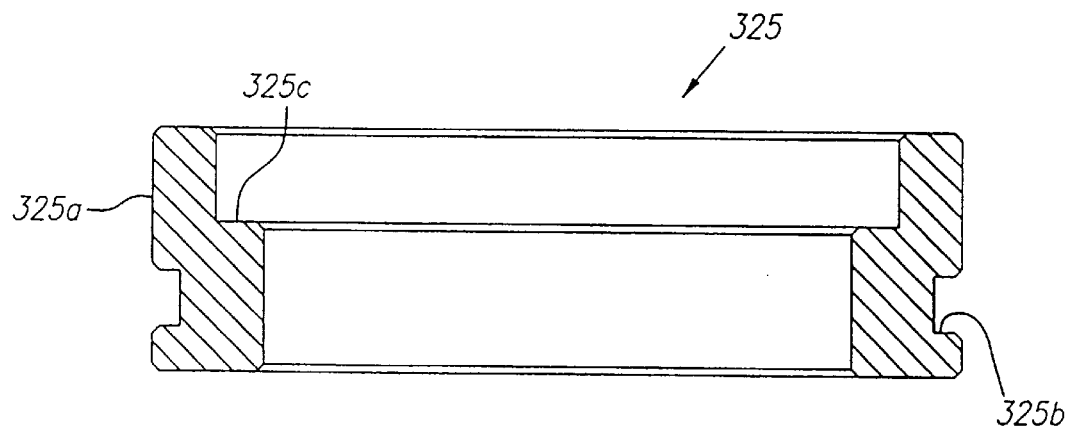
FIG. 23 is a detailed view of the bulkhead.
Figure 24:
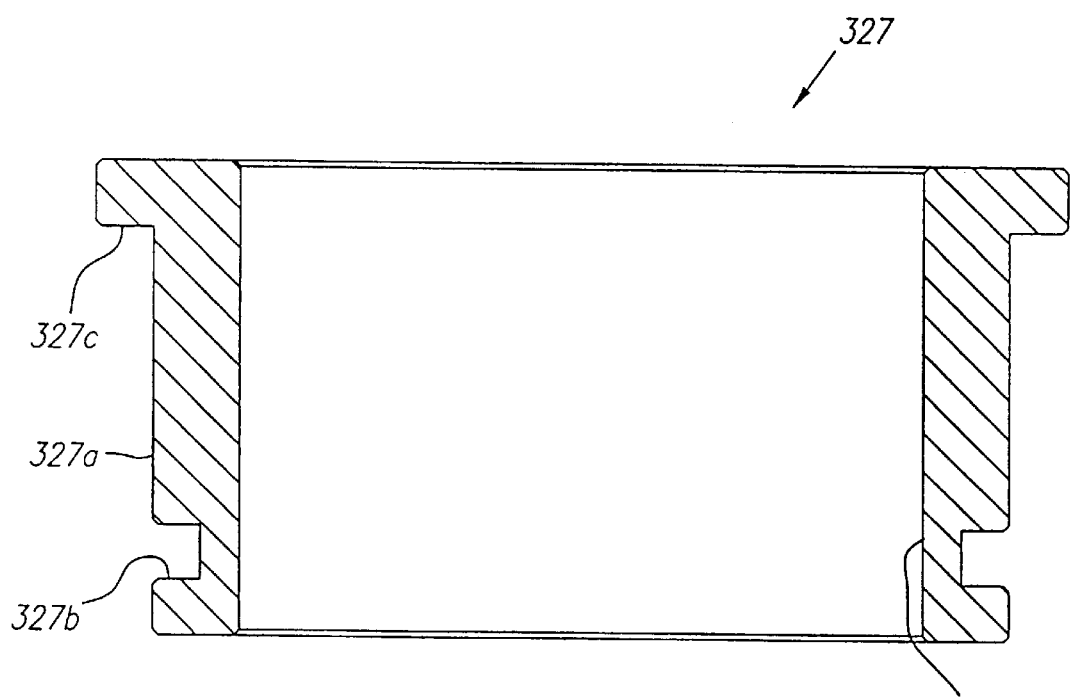
FIG. 24 is a detailed cross-sectional view of the bulkhead bushing.

FIGS. 23 and 24 illustrate details of the bulkhead 325 and the bulkhead bushing 327. The bulkhead 325 includes an annular body portion 325a with an outer annular slot 325b for engaging the cartridge housing protrusion 324 to ensure fixed position for the bulkhead 325. The bulkhead 325 also includes an inner shoulder 325c which cooperates with an outer shoulder 325c in the bulkhead bushing 327 between which the O-ring 329 is installed. The bulkhead bushing 327 is comprised of a tubular shaped body 327a having an outer slot 327b which accommodates the retaining ring 328 previously described. The bulkhead 327 has a smooth sealing surface 327d through which the piston shaft 330 may slide in a sealing relationship.

In manufacture, the bulkhead 325 is placed in position and the outer wall 321 is roller swaged to form the lip 324. The cartridge wall 321 is provided with a pair stiffening rings or enlarged wall thickness portions 321a, 321b located on opposite sides of the lip 324 to inhibit deformation of the cartridge wall 321 during the swage process.

As shown in FIG. 25B, a detent 339 is provided in the side wall 331. The detent 339 may be used in the assembly process to locate the proper relative radial position between the piston shaft 330 and the cartridge housing 320.

As best viewed in FIGS. 25 and 25A–D, the piston shaft 330 is comprised of a central tubular member 331 with a first end 332a and a second end 332b. The first end 332a has threads 332c which are threaded into the upper cap 415 which has threads 415a which in turn are threaded onto threads 214a (see FIG. 20) in the end of outer tube 214. The piston shaft 330 has a hollow tubular interior 33/a. The piston shaft 330 (as best viewed in FIG. 25d) includes a radial indentation 335 in which the retaining ring 351 seats for securing one end of the first piston 350. A second indentation 336 accommodates the O-ring 359 and the shoulder 337 abuts against the thrust washer 360. The piston 350 is therefore secured to the piston shaft 330 between the retaining ring 351 and the thrust washer 360. The O-ring 359 prevents leakage of fluid therebetween.

The piston shaft 330 is also provided with another upper annular recess 338 within which the retainer 361 may be inserted to secure the top out stopper 362 to the shaft 330. A pair of O-rings 363, 365 separated by a spacer 364 are also positioned around the piston shaft 330, the O-ring 365 functioning as a top out bumper. The top out stop 362 and related components help prevent any impact on the first piston 350 during full extension of the unit.

The shock absorbing function is accomplished by passing fluid between the first fluid chamber 510 and the second fluid chamber 520. The hollow interior 331a of the piston shaft 330 provides the passageway for the hydraulic fluid. The piston shaft includes a plurality of orifices in its preferred embodiment: a first round orifice 334a, a second round orifice 334b, each of a given diameter, and a pair of oval or slot orifices 333a, 333b positioned at 180° from the other. The locations of these orifices are best illustrated in FIGS. 25A and 25D. When a particular orifice is aligned with the flow control mechanism (described below), fluid is constricted in relation to the size of the orifice selected thereby providing the desired shock damping force.

In the illustrated embodiment, the first orifice 333a has a diameter of 1.25 mm and the second orifice 334b has a diameter of 1.0 mm. The slot orifices 333a, 333b are sized to permit relatively nonrestricted flow therethrough. The slot orifices 333a, 333b have a width of about 3.0 mm and a length (center to center) of about 6.0 mm.

The radial positions of the orifices 333a,b and slot orifices 333a,b are designed to correspond to shift positions of an off the shelf shift lever, namely the shift lever sold under the trademark Accushift, in the SunTour component line of Maeda Industries, Ltd., Osaka, Japan. The actuate (such as a shift lever) is preferably indexed with identifiable or discrete radial positions, sometimes known as "click stops". Therefore by rotational actuation of the lever to a discrete radial position, a desired position for the tuning shaft 440 may be selected.

Figure 26:
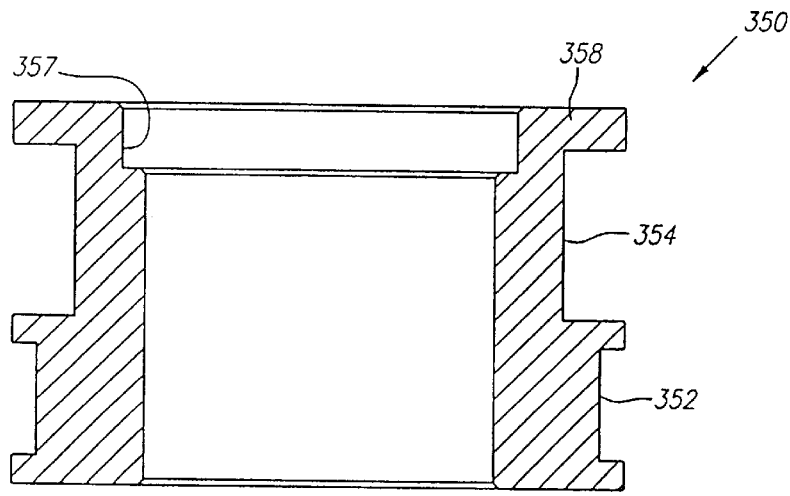
FIG. 26 is a detailed cross-sectional view of the first piston of the cartridge assembly of FIG. 21.

After passing through the respective orifice, the hydraulic fluid path extends along the tubular passageway 331 a (as best illustrated in FIGS. 25C) within the piston shaft 330 to the second piston shaft end 332b. The first piston 350 as shown in FIG. 26 is comprised of a main body having an outer flange portion 358 next to an inner circumferential shoulder 357. The O-ring 359 seats within the shoulder 357 to seal off any passage of fluid between the piston 350 and the piston shaft 330. A first outer indentation 354 accommodates an O-ring 355 and a pair of backup rings 356a–b on either side of the O-ring 355. The first piston 350 is also provided with a second outer circumferential indentation 352 for accommodating the wear ring 353. In combination, the wear ring 353 and the O-ring 355 provide a sliding seal between the first piston and an inner circumferential sidewall of the cartridge housing 320.

Figure 27:
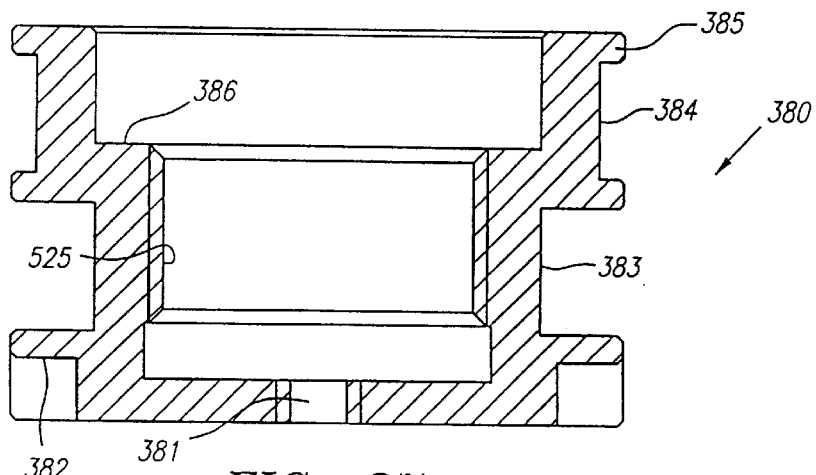
FIG. 27 is a detailed cross-sectional view of the second piston of the cartridge assembly of FIG. 21.

Details of the design of the second piston 380 are shown in FIG. 27. Second piston 380 has a main body housing including a front flange portion 385. An outer annular recess 384 is provided adjacent the flange portion 385. A wear ring 387 is disposed in the recess 384 to provide the sliding fit between the cartridge cylinder wall 321 and the second piston 380 (see FIG. 21). Second piston 380 may also be provided with a second annular recess 383 which may accommodate a seal such as an O-ring (not shown), if desired. Otherwise the recess may be omitted by removal of the flange portion 382 in the rear end thereof. The second piston 380 includes a threaded port 381 bleeding off fluid during assembly. The port 381 is blocked off by a screw 389 after the fluid charge is completed.

Figure 28:
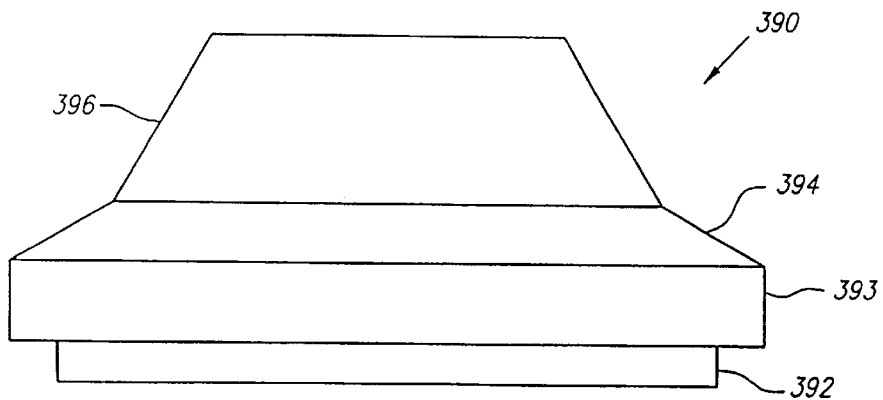
FIG. 28 is a detailed view of the poppet of the cartridge assembly of FIG. 21.

As shown in detail of FIG. 28, the poppet 390 includes a cone-shaped front portion 396 tapered or fanning outward to a seat surface 394 to an outer longitudinal surface 393. The poppet spring 388 urges the seat surface 394 of the poppet 390 against a corresponding seal surface 331b in the piston shaft 330. During compression, fluid pressure within the piston shaft 330 overcomes the spring pressure of the poppet valve and fluid is permitted to enter into the poppet chamber 525 through holes 342 in the piston shaft 330. The taper on the poppet seat 394 provides a tapered or progressive action, progressive force being provided by the poppet spring 388. The poppet 390 is also provided with a ridged portion 392 to allow some backflow when the poppet is not in operation. A small bypass hole 344 is also provided in the side wall of the piston shaft 330 to permit slow speed bypass of fluid behind the poppet to be vented from the central passage 331 a of the piston shaft 330 into the second fluid chamber 520 and vice versa. The hole 344 is relatively small, approximately 1.0 mm in diameter, so only a desirable amount of fluid is permitted to pass therethrough. Once the compression force has ceased, the poppet spring 388 closes and the rebound phase also is actuated, the rebound force being provided by the air spring of air chamber 540. The small bypass hole 344 is sized to offer a metered amount of flow restriction.

Figure 29:
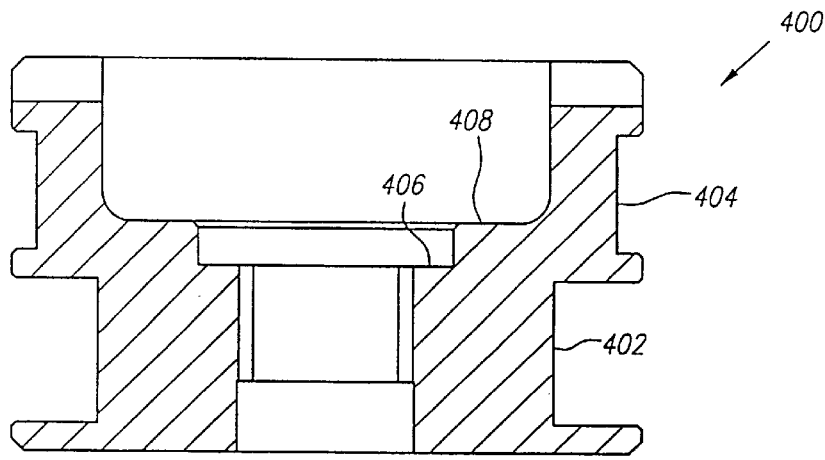
FIG. 29 is a detailed cross-sectional view of the air/oil separator piston of the cartridge assembly of FIG. 21.

FIG. 29 illustrates details of the air/oil separator piston 400. The piston 400 on one end includes a recess forming shoulder 408 against which the screw head 405 may be mounted. A second shoulder 406 provides a comer surface to accommodate placement of an O-ring 407 to seal between the head of the screw 405 and the body of the separator piston 400. Separator piston 400 also includes a first outer annular recess 404 which accepts a wear ring 401 and a second annular recess 402 which accepts the air/oil seal 403 for providing the sealing and sliding surfaces between the air/oil separator piston 400 and the inner wall of the cartridge cylinder 320. The seal 403 is preferably a quad seal structure manufactured out of nitrile, Buna N or the like. Since the floating seal 400 seeks a zero differential condition, stiction is reduced/minimized as the seal need not seal off a high pressure differential.

Figure 30:
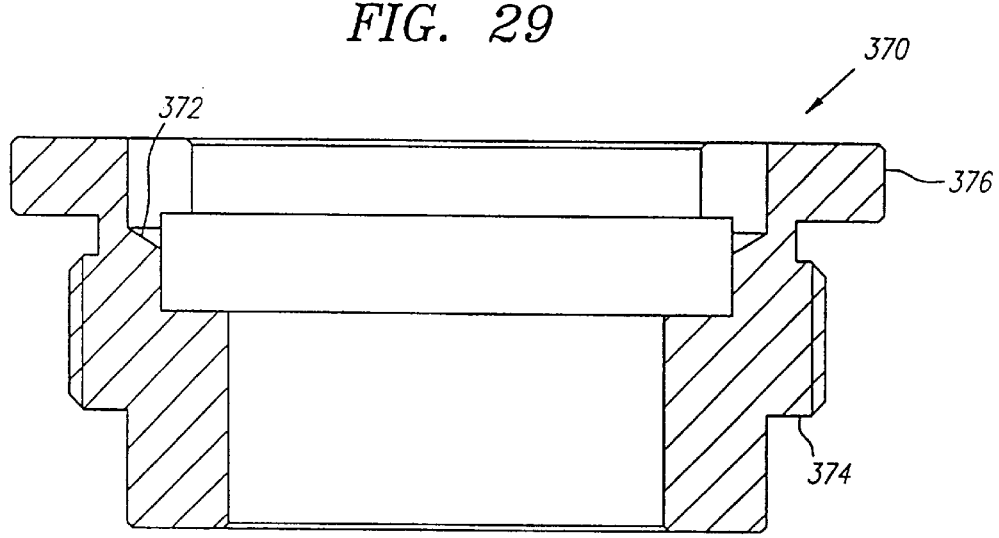
FIG. 30 is a side elevation view of the poppet associated with the second piston of FIG. 28.

The first end 322a of the cartridge cylinder 320 is capped off by an upper gland 370 (details of which are illustrated in FIG. 30). The upper gland 370 includes an outer annular lower shoulder 374 which cooperates with an O-ring 377 to seal off between the inner wall of the cartridge cylinder 320 and the upper gland 370. The gland 370 also includes an inner annular recess 372 which accommodates a rod wiper seal 379 to seal off between the piston shaft 330 and the gland 370.

Figure 31:
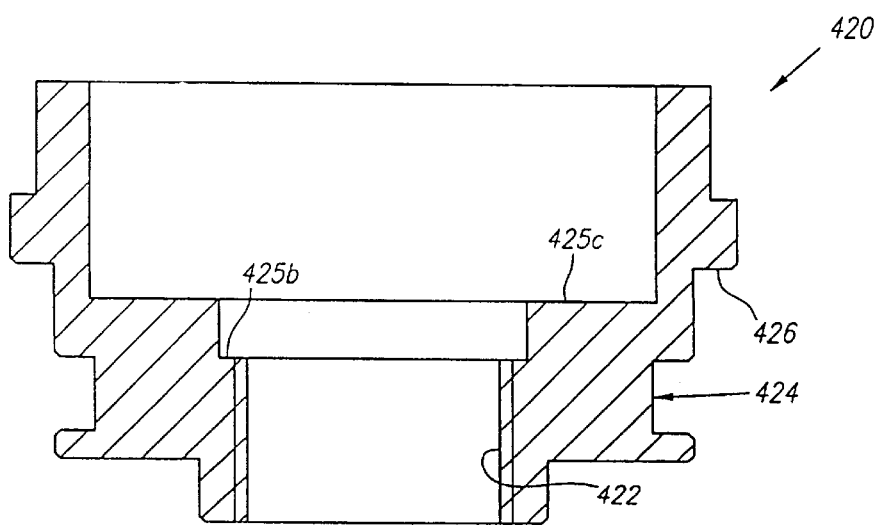
FIG. 31 is a detailed cross-sectional view of a second gland which fits into the second end of the cartridge cylinder of FIG. 22.

A second gland 420 seals off the second end 322b of the cartridge cylinder. Details of the second gland are illustrated in FIG. 31. The gland 420 includes a central opening 422 through which the Schraeder valve 430 receives access into the air chamber S40. The Schraeder valve 430 is secured to the gland 420 by a nut 425 with an O-ring 425a installed in an inner annular shoulder 425b, the nut 425 resting against a second annular shoulder 425c within the gland 420. The gland 420 also includes an outer annular shoulder 426 and an outer annular recess 424 which accommodate respective O-rings 428, 427 to seal off between the gland 420 and the side wall of the cartridge cylinder 320.

Figure 32:
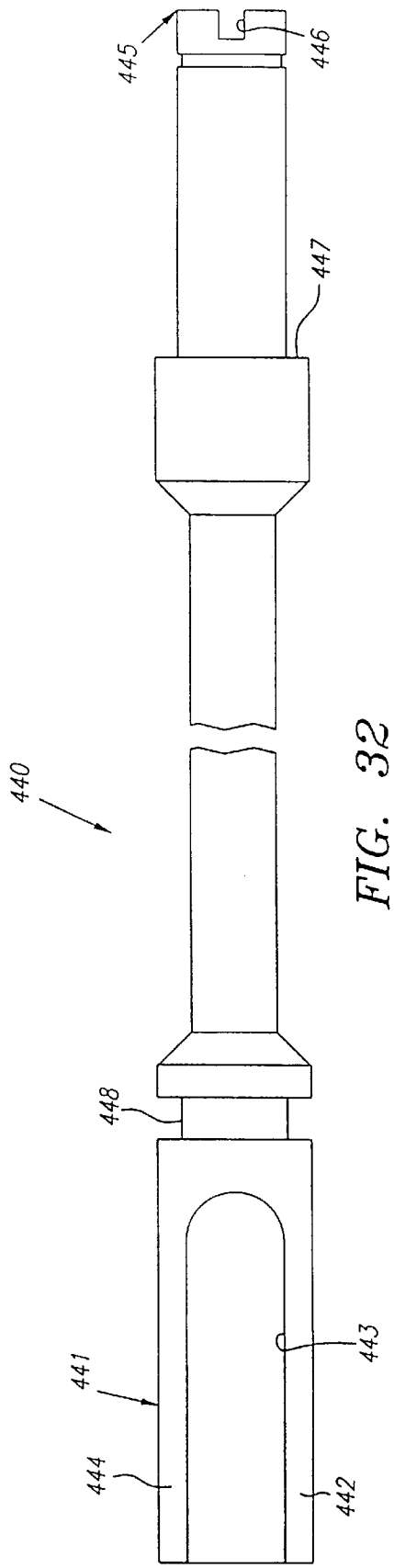
FIG. 32 is a detailed view of the tuning shaft of the cartridge assembly of FIG. 21.

When used in combination with a bicycle, such as a mountain bike, it is expected that the rider may desire to selectively control the stiffness of the shock such as by merely operating a lever similar to the lever conventionally found for changing gears of the bike. FIG. 21 illustrates a shock absorbing system 300 having a shock adjusting or shock control device including a tuning shaft 440 which permits a variable given shock damping amount to be applied by the unit. FIG. 32 illustrates details of the tuning shaft 440 which has a connector end 445 and a controller end 441. The connector end 445 has a slot 446 for fine tuning of the damping adjustment mechanism. The indexing adjustment mechanism, which may comprise a hand operated controller on the bike (not shown) may then be attached to the shaft portion 449.

The tuning shaft 440 extends along the interior of the piston shaft 330 and extends outward pass the outer tube cap 415. Thrust washers 417, 419 are provided between the outer tube cab 415 and the outer shoulder 447 of the tuning shaft to facilitate easy rotation of the tuning shaft 440. The outer tube cap is secured to the first end of the piston shaft 330 by threaded connection or other suitable method. The tuning shaft 440 also includes an outer annular recess 448 just to the side of the control section 441 to accommodate an O-ring 460 to prevent leakage of fluid from the first chamber 510 between the outer surface of the tuning shaft 440 and the inner surface of the piston shaft 330. The control portion 441 of the tuning shaft 440 includes a pair of flutes 442, 444 each having a respective gap 443 therebetween. The flute portion of the tuning shaft and indeed the entire tuning shaft are preferably made of a plastic material, preferably acetal plastic such as that sold under the tradename Delrin. The outer cylindrical surface of the flutes 442, 444 are manufactured to a very precise clearance fit adjacent the holes 334*a*, 334*b*, 333*a*, 333*b* in the piston shaft 330. By turning the tuning shaft to a specific rotational position, the gaps 443 and the tuning shaft 440 will selectively align with a desired hole 334*a*, 334*b* or slot 333*a* or 333*b* in the piston shaft.

In a first operational mode, when the gaps 443 align with a particular hole, such as hole 334*a* or 334*b*, hydraulic fluid is allowed to pass only through that hole and the size of the hole determines the damping rate of the hydraulic member.

In contrast, the slots 333*a* and 333*b* operate as very large holes and when aligned with the gaps 443 in the tuning shaft 440 permit a maximum amount of hydraulic fluid to pass therethrough so that the unit may provide no hydraulic dampening if so desired.

In the first and second operational modes, the air spring mechanism remains operational to provide a spring cushion ride. In a third operational mode, the flutes 442 and 444 cover all holes and slots within the piston shaft (i. e., the gaps 443 not aligned with any of the holes 334*a,b* or slots 333*a,b*). In this third mode, the passage of fluid between the chambers is blocked off and due to the inclusion of the bulkhead, when the first piston 350 attempts to compress the fluid within the first chamber 510, there is no place for the fluid to go. Since the hydraulic fluid is practically incompressible, the third mode provides a lock mode ("virtual lock out" for the shock absorber) in which the air spring provides virtually no cushioning effect and the hydraulic members provide virtually no hydraulic shock absorbing effect. In a bicycling application such a setting may be desirable for example when riding on a smooth road surface, sprinting, or out of the saddle climbing.

The described shock design provides a floating oil seal on an air spring cushion. By having the air chamber 540 acting upon the floating oil chamber (the system requires that an air/oil seal be provided between a moving piston and a cylinder wall), high pressure air in the air chamber 540 acts externally on the air/oil sealing surfaces providing additional seal action to prevent leakage of hydraulic fluid from out of the hydraulic chamber. Since the second piston is "floating" on the compressed air spring within the air chamber 540 and any compression by the air/oil separator piston 400 is compensated for by a corresponding increase in pressure in the air chamber 540 rather than having a hydraulic chamber attempting to escape through a sealing surface to a location at atmospheric pressure, the pressure in the air chamber 540 acts to seal and urge the hydraulic fluid to remain within respective hydraulic fluid chambers.

Figure 33:
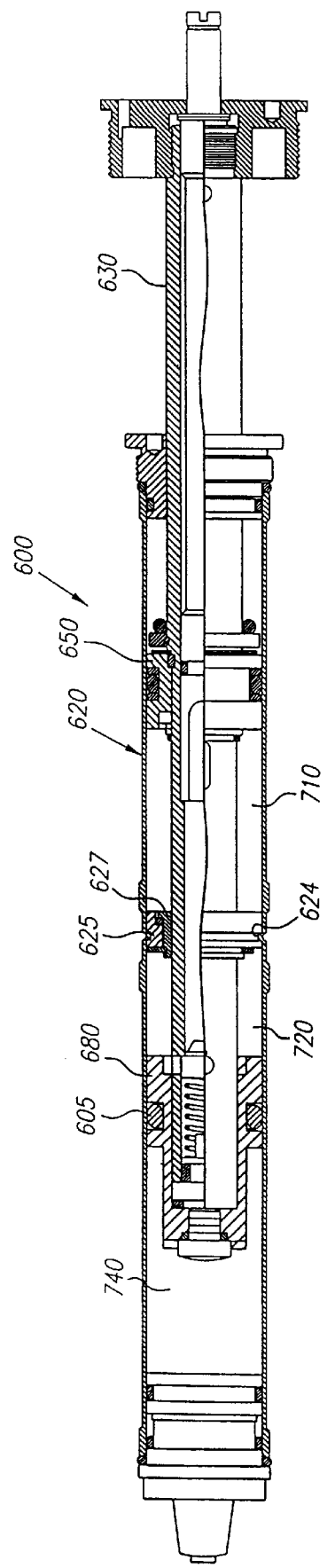
FIG. 33 is a side elevation view in partial cross section of an alternate shock absorber cartridge.

FIG. 33 is a side elevation view and partial cross section of an alternative shock absorber cartridge 600 having an outer cylinder cartridge 620 and a piston shaft 630 axially disposed therein. The piston shaft 630 includes a first piston cylinder 650 and a second piston cylinder 680. The cartridge cylinder 620 includes a bulkhead lip 624 which secures a bulkhead 625 and bulkhead bushing 627 in position about the piston shaft 630. The bulkhead 625 forms first and second fluid chambers 710, 720. The flow restriction and control aspects of this embodiment are the same as the previous embodiment except for the lower piston 680 is a single/oil separator piston (there is no floating piston in this embodiment) separating the second fluid chamber 720 from the air spring chamber 740. A seal 605 is associated with the second piston 680 between the wall of the cartridge cylinder 620 and the second piston 680 sealing off the fluid chamber 720 from the air chamber 740. As in the previous embodiment, the seal 605 has high pressure air on one side thereof which assists in sealing off and preventing leakage of fluid 720 and shock actuation. Without the floating seal, the cartridge 600 may experience cavitation as a result of thermal expansion/contraction of the hydraulic fluid. A chamber separated by a diaphragm may be provided proximate the second fluid chamber 720, for example, to accommodate for hydraulic fluid expansion/contraction.

While embodiments of the present invention have been shown and described, various modifications may be made without departing from the scope of the present invention, and all such modifications and equivalents are intended to be covered.

What is claimed is:

1. A suspension assembly, comprising:
   an inner tube;
   an outer tube coaxially mounted with the inner tube, the inner and outer tubes being adapted to telescope with respect to each other; and
   a self-contained shock-damping cartridge disposed in the inner and outer tubes and hydraulic damping fluid for damping telescoping movement between the inner and outer tubes the cartridge further comprising first and second chambers containing hydraulic fluid, a first shaft movably extending substantially completely through first and second chambers;
   wherein the cartridge is configured for substantially sealing the hydraulic fluid within the cartridge during the telescoping movement such that the cartridge is removable as a unit.

2. A suspension assembly, comprising:
   an inner tube;
   an outer tube coaxially mounted with the inner tube, the inner and outer tubes being adapted to telescope with respect to each other;
   a self-contained shock-damping cartridge disposed in the inner and outer tubes and removable as a unit, the cartridge comprising:
      first and second chambers containing hydraulic fluid,
      a first shaft movably extending substantially completely through both the first and second chambers, and
      a piston associated with the first chamber and the first shaft such that movement of the first shaft within the chamber forces the hydraulic fluid from one of the chambers to the other for damping telescoping movement between the inner and outer tubes;
      wherein the cartridge is sealed to substantially prevent the hydraulic fluid from entering and exiting the cartridge during telescoping movement.

3. The suspension assembly of claim 2, wherein the cartridge has a first end attached to the inner tube and a second end attached to the outer tube.

4. The suspension assembly of claim 2, wherein the cartridge is configured for damping telescoping movement between the inner and outer tubes at a manually variable damping rate.

5. The suspension assembly of claim 2, further comprising a spring disposed in the inner tube for cushioning telescoping movement between the inner and outer tubes.

6. The suspension assembly of claim 5, wherein the spring comprises a gas chamber having gas pressure for acting as a spring.

7. The suspension assembly of claim 5, wherein the spring is disposed within the cartridge.

8. The suspension assembly of claim 2, wherein one of the tubes is configured for supportively to a bicycle frame and other is configured for supportively connecting to a bicycle wheel.

9. A suspension fork assembly comprising the suspension assembly of claim 2.

10. The suspension assembly of claim 2, wherein the cartridge defines a fluid passage fluidly communicating the first and second chambers.

11. The suspension assembly of claim 2, wherein the cartridge contains substantially all of the hydraulic damping fluid employed for damping telescoping movement between the inner and outer tubes.

12. The suspension assembly of claim 2, wherein the cartridge comprises an outer housing that is sealed to the hydraulic fluid.

13. The suspension assembly of claim 2, wherein the chambers are sealed to substantially prevent the hydraulic fluid from entering and exiting the first and second chambers collectively during telescoping movement.

14. The suspension assembly of claim 13, wherein the first and second chambers are disposed in longitudinal relationship with each other in the cartridge.

15. A suspension assembly, comprising:
   a suspension fork configured for connecting between a wheel and handlebars, the fork including:
      an inner tube, and
      an outer tube coaxially mounted with the inner tube, the inner and outer tubes being adapted to telescope with respect to each other; and
   a self-contained shock-damping cartridge disposed in the inner and outer tubes and removable as a unit, the cartridge comprising:
      first and second chambers containing hydraulic fluid,
      a first shaft movably extending substantially completely through both the first and second chambers, and
      a piston associated with the first chamber and the first shaft such that movement of the first shaft with respect to the chambers forces the hydraulic fluid from one of the chambers to the other for damping telescoping movement between the inner and outer tubes;
      wherein the cartridge is sealed to substantially prevent the hydraulic fluid from entering and exiting the cartridge during the telescoping movement.

16. The suspension assembly of claim 15, wherein the cartridge is configured for damping telescoping movement between the inner and outer tubes at a damping rate and comprises a damping control member movably disposed within the first shaft and associated with the passage for controllably restricting flow of the fluid through the passage for adjusting the damping rate.

17. The suspension assembly of claim 15, wherein the piston is secured to the first shaft for movement therewith.

18. The suspension assembly of claim 15, wherein the piston is disposed adjacent the first chamber.

19. The suspension assembly of claim 15, wherein the cartridge has a cartridge housing defining the first and second chambers, the cartridge housing being attached to one of the tubes, and the shaft being attached to another of the tubes.

20. The suspension assembly of claim 19, wherein the cartridge includes a bulkhead fixed to the cartridge housing and separating the first and second chambers.

21. The suspension assembly of claim 19, wherein:
   the housing has longitudinally opposed first and second ends; and
   the shaft penetrates only the first end of the cartridge housing.

22. A suspension assembly, comprising:
   a self-contained cartridge disposable in a first tube that is telescopically associated with a second tube, the cartridge being removable from the first and second tubes as a unit and comprising:
      first and second chambers containing hydraulic fluid,
      a first shaft movably extending substantially completely through both the first and second chambers, and
      a piston associated with the first chamber and the first shaft such that movement of the first shaft with respect to the chambers forces the hydraulic fluid from one of the chambers to the other for damping telescoping movement between the first and second tubes;
      wherein the cartridge is sealed to substantially prevent the hydraulic fluid from entering and exiting the cartridge during the telescoping movement.

* * * * *